United States Patent
Ellis et al.

(10) Patent No.: US 6,324,594 B1
(45) Date of Patent: Nov. 27, 2001

(54) SYSTEM FOR TRANSFERRING DATA HAVING A GENERATOR FOR GENERATING A PLURALITY OF TRANSFER EXTEND ENTRIES IN RESPONSE TO A PLURALITY OF COMMANDS RECEIVED

(75) Inventors: Jackson L. Ellis; David R. Noeldner; David M. Springberg; Graeme M. Weston-Lewis, all of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/223,878

(22) Filed: Dec. 31, 1998

Related U.S. Application Data

(62) Division of application No. 09/183,694, filed on Oct. 30, 1998.

(51) Int. Cl.[7] .................................................. G06F 13/14
(52) U.S. Cl. .................................................. 710/5; 710/24
(58) Field of Search .................................... 710/5, 22–24, 710/35; 709/101; 711/1, 100, 133, 159

(56) References Cited

U.S. PATENT DOCUMENTS

| | | | |
|---|---|---|---|
| 4,262,332 | 4/1981 | Bass et al. | 364/200 |
| 4,543,626 | 9/1985 | Bean et al. | 364/200 |
| 4,615,001 * | 9/1986 | Hudgins, Jr. | 709/102 |
| 4,783,730 | 11/1988 | Fischer | 364/200 |
| 5,146,578 * | 9/1992 | Zangenehpour | 711/137 |
| 5,208,745 * | 5/1993 | Quentin et al. | 364/188 |
| 5,379,381 | 1/1995 | Lamb | 395/275 |
| 5,522,054 | 5/1996 | Gunlock et al. | 395/439 |
| 5,586,295 | 12/1996 | Tran | 395/464 |
| 5,828,901 | 10/1998 | O'Toole et al. | 395/842 |
| 5,870,583 | 2/1999 | Maeda | 395/497.01 |
| 6,049,842 * | 4/2000 | Garrett et al. | 710/33 |
| 6,081,849 | 6/2000 | Born et al. | 710/7 |
| 6,108,722 * | 8/2000 | Troeller et al. | 710/26 |
| 6,141,731 * | 10/2000 | Beardsley et al. | 711/136 |
| 6,154,793 * | 11/2000 | MacKenna et al. | 710/23 |
| 6,199,121 | 3/2001 | Olson et al. | 710/24 |

OTHER PUBLICATIONS

IBM Technical Disclosure Bulletin—High Performance DMA Controller/CPU Interface Mechanism—vol. 36 –No. 2 –Feb. 1993 –Journal –pp. 131–133.*

* cited by examiner

Primary Examiner—Thomas Lee
Assistant Examiner—Thuan Du

(57) ABSTRACT

The present invention includes a Command Queuing Engine (CQE) that is a firmware-assist block which processes some of the firmware tasks related to command and context management preferably for SCSI. When enabled, CQE will decode SCSI commands as they arrive, and determine if DMA contexts can be automatically configured and started to transfer the data for those commands. CQE can also program DMA contexts to automatically return status information either after the disk has completed a transfer (as in non-cached writes) or after the DMA transfer is completed (as in reads or cached writes). CQE also utilizes a buffer-based linked-list to queue the SCSI commands as they arrive for future DMA context configuration. The present invention provides automated recognition and linking of commands belonging to a common thread, i.e., are sequential. The present invention also provides extensive thread boundary information and flexible firmware control for reordering commands. Automatic TE entry generation and storage to buffer memory, and automatic TE retrieval from the buffer memory and execution of entire command threads are further features provided by the present invention. As a result, bus command response latency is decreased by reducing the delay for the command to be started and at the end of the data transfer for status to be send. Disk efficiency is increased by reducing the latency to back-fill or empty a buffer memory segment of data that will be transferred. Furthermore, the present invention is a low-cost trade-off between hardware and firmware functionality.

17 Claims, 11 Drawing Sheets

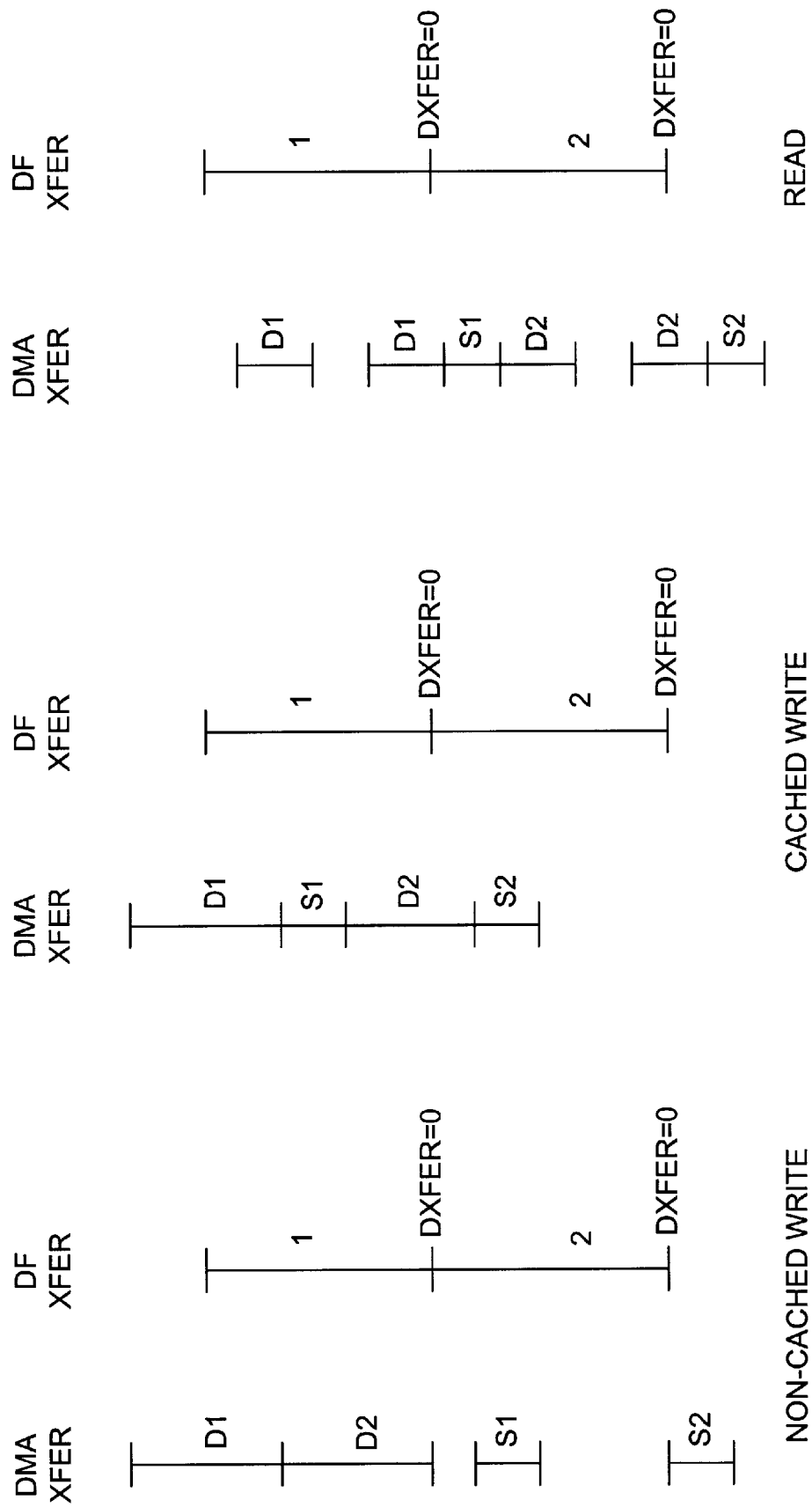

| S_SRF1 ADDRESS | S_SRF2 ADDRESS | AUTOMATED COMMANDS | | NON-AUTOMATED COMMANDS | |
|---|---|---|---|---|---|
| | | HIGH BYTE | LOW BYTE | HIGH BYTE | LOW BYTE |
| 0C80h | 0CB0h | InitID (3:0) | IDENTIFY | InitID (3:0) | IDENTIFY |
| 0C82h | 0CB2h | UNUSED | UNUSED | UNUSED | UNUSED |
| 0C84h | 0CB4h | OPCODE | LUN | CDB0 (OPCODE) | CDB1 |
| 0C86h | 0CB6h | QUEUE CODE | QUEUE TAG | QUEUE CODE | QUEUE TAG |
| 0C88h | 0CB8h | LBA (NLSB) | LBA (LSB) | CDB4 | CDB5 |
| 0C8Ah | 0CBAh | LBA (MSB) | LBA (NMSB) | CDB2 | CDB3 |
| 0C8Ch | 0CBCh | SECONDARY LBA (NLSB) | SECONDARY LBA (LSB) | CDB8 | CDB9 |
| 0C8Eh | 0CBEh | SECONDARY LBA (MSB) | SECONDARY LBA (NMSB) | CDB6 | CDB7 |
| 0C90h | 0CC0h | LENGTH (NLSB) | LENGTH (LSB) | CDB12 | CDB13 |
| 0C92h | 0CC2h | LENGTH (MSB) | LENGTH (LMSB) | CDB10 | CDB11 |
| 0C94h | 0CC4h | SRF1S/SRF2S (RO) | | SRF1S/SRF2S (RO) | |
| 0C96h | 0CC6h | RESERVED BYTE | CONTROL BYTE | CDB14 | CDB15 |
| 0C98h | 0CC8h | SRF1FLL/SRF2FLL | | SRF1FLL/SRF2FLL | |
| 0C9Ah | 0CCAh | SRF1FLH/SRF2FLH | | SRF1FLH/SRF2FLH | |
| 0C9Ch | 0CCCh | SRF1TCP/SRF2TCP | | SRF1TCP/SRF2TCP | |
| 0C9Eh | 0CCEh | SRF1TPP/SRF2TPP | | SRF1TPP/SRF2TPP | |
| 0CA0h | 0CD0h | SRF1CQES/SRF2CQES | | SRF1CQES/SRF2CQES | |

FIG. 7a

| BYTE | AUTOPOSITIONED | NON AUTOPOSITIONED | REG FILE 1 ADDRESS | REG FILE 2 ADDRESS |
|---|---|---|---|---|
| BYTE 0 | InitID | InitID | 0C81h | 0CB1h |
| BYTE 1 | IDENTIFY | IDENTIFY | 0C80h | 0CB0h |
| BYTE 2 | QUEUE CODE | QUEUE CODE | 0C87h | 0CB7h |
| BYTE 3 | QUEUE TAG | QUEUE TAG | 0C86h | 0CB6h |
| BYTE 4 | OPCODE | CDB0 | 0C85h | 0CB5h |
| BYTE 5 | LUN | CDB1 | 0C84h | 0CB4h |
| BYTE 6 | LBA (MSB) | CDB2 | 0C8Bh | 0CBBh |
| BYTE 7 | LBA (NMSB) | CDB3 | 0C8Ah | 0CBAh |
| BYTE 8 | LBA (NLSB) | CDB4 | 0C89h | 0CB9h |
| BYTE 9 | LBA (LSB) | CDB5 | 0C88h | 0CB8h |
| BYTE 10 | SLBA (MSB) | CDB6 | 0C8Fh | 0CBFh |
| BYTE 11 | SLBA (NMSB) | CDB7 | 0C8Eh | 0CBEh |
| BYTE 12 | SLBA (NLSB) | CDB8 | 0C8Dh | 0CBDh |
| BYTE 13 | SLBA (LSB) | CDB9 | 0C8Ch | 0CBCh |
| BYTE 14 | LEN (MSB) | CDB10 | 0C93h | 0CC3h |
| BYTE 15 | LEN (NMSB) | CDB11 | 0C92h | 0CC2h |
| BYTE 16 | LEN (NLSB) | CDB12 | 0C91h | 0CC1h |
| BYTE 17 | LEN (LSB) | CDB13 | 0C90h | 0CC0h |
| BYTE 18 | RESERVED BYTE | CDB14 | 0C97h | 0CC7h |
| BYTE 19 | CONTROL BYTE | CDB15 | 0C96h | 0CC6h |

CQE SEQUENTIAL FIELDS

| BIT 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RESERVED | | | ENSEQ | DISCPRIV | CQETTD | CQELINK | COEFLAG | COENACA | CQEREAD | CQEQCODE | | | | CQEInitID | |

FIG. 8b

CQE FINAL LSA LOW WORD

| BIT 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CQEFLLWORD | | | | | | | | | | | | | | | |

FIG. 8c

CQE FINAL LSA HIGH WORD

| BIT 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CQEFLHWORD | | | | | | | | | | | | | | | |

FIG. 8d

CQE STATUS

| BIT 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RESERVED | | CMDGTMAX | | NXTPTRVLD | QFULLBUSY | SEQCMND | RWCMND | AWROK | ACWROK | ACRDOK | TEGIP | CAF | TEFULL | DTEEOFQ | STEEOFQ |

| CDB | REGISTERS | REGISTER FILE | TCB 1 | TCB 2 | TCB 3 |
|---|---|---|---|---|---|
| LSA=0<br>LEN=2 | FINAL LSA=2<br>CURRENT POINTER=0<br>PREVIOUS POINTER=X | PREV. FINAL LSA=X<br>CURRENT POINTER=0<br>PREVIOUS POINTER=X | FIRST TE=0<br>LAST TE=X<br>FIRST LSA=0<br>FINAL LSA=X | | |
| LSA=2<br>LEN=3 | FINAL LSA=5<br>CURRENT POINTER=1<br>PREVIOUS POINTER=0 | PREV. FINAL LSA=2<br>CURRENT POINTER=1<br>PREVIOUS POINTER=0 | FIRST TE=0<br>LAST TE=X<br>FIRST LSA=0<br>FINAL LSA=X | | |
| LSA=1000<br>LEN=1 | FINAL LSA=1001<br>CURRENT POINTER=2<br>PREVIOUS POINTER=1 | PREV. FINAL LSA=5<br>CURRENT POINTER=2<br>PREVIOUS POINTER=1 | FIRST TE=0<br>LAST TE=1<br>FIRST LSA=0<br>FINAL LSA=5 | FIRST TE=2<br>LAST TE=X<br>FIRST LSA=1000<br>FINAL LSA=X | |
| LSA=5<br>LEN=1 | FINAL LSA=6<br>CURRENT POINTER=3<br>PREVIOUS POINTER=2 | PREV. FINAL LSA=1001<br>CURRENT POINTER=3<br>PREVIOUS POINTER=2 | FIRST TE=0<br>LAST TE=1<br>FIRST LSA=0<br>FINAL LSA=5 | FIRST TE=2<br>LAST TE=2<br>FIRST LSA=1000<br>FINAL LSA=1001 | FIRST TE=3<br>LAST TE=X<br>FIRST LSA=5<br>FINAL LSA=X |

FIG. 9

SYSTEM FOR TRANSFERRING DATA HAVING A GENERATOR FOR GENERATING A PLURALITY OF TRANSFER EXTEND ENTRIES IN RESPONSE TO A PLURALITY OF COMMANDS RECEIVED

RELATED APPLICATION

The present application is a divisional of copending U.S. patent application Ser. No. 09/183,694, filed on Oct. 30, 1998, still pending.

FIELD OF THE INVENTION

The present invention relates to a firmware assist block and more particularly to hardware that performs firmware tasks related to command and context management of a data controller.

BACKGROUND OF THE INVENTION

A data controller is included in the electronics of a peripheral device such as a CD-ROM or a hard drive. In FIG. 1, a peripheral device 100 is coupled to a host adapter board ("HAB") 110 included in a host 120. Peripheral device 100 includes a data storage medium 130 that is coupled to a servo and read/write channel 140. Servo and read/write channel 140 is coupled to a data controller 150 and a microprocessor 160. Data controller 150 is coupled to buffer memory illustrated as a RAM 170 and a peripheral bus 180. Another memory, shown as SRAM 190, is coupled to microprocessor 160 as local storage.

The general function of data controller 150 is to process commands from a requestor or initiator, such as host 120. Host 120 can be a personal computer, workstation, server or other peripheral device. Data controller 150 performs data transfers associated to those commands with the data storage medium 130 of peripheral 100, e.g., magnetic or optical disk. In more detail, data controller 150 processes the commands to configure itself for the associated data transfers. The commands may not request data transfers, but may request status of the peripheral device. Data controller 150 must also process these commands.

Different bus architectures and protocols exist for peripheral bus 180 that provide the commands. Such architecture and protocols are defined by, for example, ATA, ISA, IDE, USB, SCSI and Fibre Channel. For example, a SCSI command known as control descriptor block ("CDB") includes an operational code consisting of a group code and a command code, a logical unit number, logical block addresses (LBAs) if required, a transfer length value if required and a control byte. The transfer length value specifies the number of blocks (or other data units) that are to be transferred with an associated command. Thus, data controller 150 must be able to at least process one of those command protocols.

Typically, data controller 150 processes the commands using firmware. Use of firmware, however, requires increased storage space associated with the data controller. As a result, the physical requirement and cost of data controller 150 are increased. The firmware also requires microprocessor 160 intervention, which prevents microprocessor 160 from performing other tasks and requires more time to process the data transfer due to the time needed to execute the firmware. For example, a data write to data storage medium 130 may be too large for data controller 150 to process while connected to SCSI bus 180. Microprocessor 160 must be interrupted and used to program data controller 150 to disconnect itself SCSI from bus 180. When data controller 150 is capable of receiving more data, the microprocessor is interrupted again and then programs data controller 150 to reconnect itself to SCSI bus 180. Some data writes may require this disconnect/reconnect sequence numerous times. These disadvantages associated with microprocessor 160 limit the data transfer rate between host 120 and peripheral 100. This limiting of the data transfer rate is contrary to the present industry effort to increase that data transfer rate.

To further illustrate, some data transfers can have a sequence of commands where the LBAs are within a certain range. In this case, microprocessor 160 is interrupted numerous times BE to process the commands associated with the LBAs. This is a particularly wasteful use of microprocessor 160 resources since the LBAs are located within that range and the data controller does not take advantage of this situation.

Therefore, a need exists for a data controller that can provide a data transfer rate greater than a purely firmware oriented data controller, and at the same time minimize the required memory space. The present invention meets this need.

SUMMARY OF THE INVENTION

The present invention includes a Command Queuing Engine (CQE) that is a firmware-assist block which processes some of the firmware tasks related to command and context management preferably for SCSI. When enabled, the CQE will decode SCSI commands as they arrive, and determine if DMA contexts can be automatically configured and started to transfer the data for those commands. The CQE can also program DMA contexts to automatically return status information either after the disk has completed a transfer (as in non-cached writes) or after the DMA transfer is completed (as in reads or cached writes). The CQE also utilizes a buffer-based linked-list to queue the SCSI commands as they arrive for future DMA context configuration.

CQE assists the firmware in achieving a very high input/output per second ("IO/Sec") rating when receiving sequential commands. Sequential commands are defined as commands whose parameters are the same except for their respective LBA, Queue Tag and length; however the LBA is within a predetermined range from the end of the previous command's transfer LBA. As sequential commands arrive, Transfer Extend (TE) entries are created in a Transfer Extend linked-list ("TE list") and then the SCSI commands are discarded. The CQE retrieves TE entries from the TE list one at a time. Then, the CQE programs corresponding DMA contexts to transfer data and status as the contexts and disk allow. To handle a thread of sequential commands, the microprocessor only receives non-error interrupts at the start of the thread (to aid in the initial DMA and data formatter ("DF") context setups), optionally in the middle when the DF needs to change tracks and at the end when a new sequential thread is pending.

The CQE also provides assistance for the firmware to re-order queued commands. By default, the CQE handles commands in the order they arrive. However, the firmware receives the interrupts required to allow re-ordering of the commands into sequential threads or for the purpose of reducing disk seek times. The firmware can manage multiple TE lists to optimize how sequential threads are built as commands arrive. Random commands or non-Read/Write commands are merged into the TE list such that the microprocessor can handle those commands in the time frame it determines as appropriate.

The present invention provides automated recognition and linking of commands belonging to a common thread, i.e., are sequential. The present invention also provides extensive thread boundary information and flexible firmware control for reordering commands. Automatic TE entry generation and storage to buffer memory, and automatic TE retrieval from the buffer memory and execution of entire command threads are further features provided by the present invention. As a result, bus command response latency is decreased by reducing the delay for the command to be started and at the end of the data transfer for status to be sent. Disk efficiency is increased by reducing the latency to back-fill or empty a buffer memory segment of data that will be transferred. Furthermore, the present invention is a low-cost trade-off between hardware and firmware functionality.

Numerous other advantages and features of the present invention will become readily apparent from the following detailed description of the invention and the embodiment thereof, from the claims and from the accompanying drawings in which details of the invention are fully and completely disclosed as a part of this specification.

BRIEF DESCRIPTION OF THE DRAWINGS

In the drawings,

FIGS. 6A–6C illustrate the interoperability of the data and status retrieval channels relative to data transfer;

FIGS. 7A and 7B show the address locations and order for register files according to the present invention;

FIGS. 8A–8D show registers used for the TE generator according to the present invention;

FIG. 9 shows stored values for generating TE entries and TCBs according to the present invention.

DETAILED DESCRIPTION OF THE PREFERRED EMBODIMENT

Figure 1:
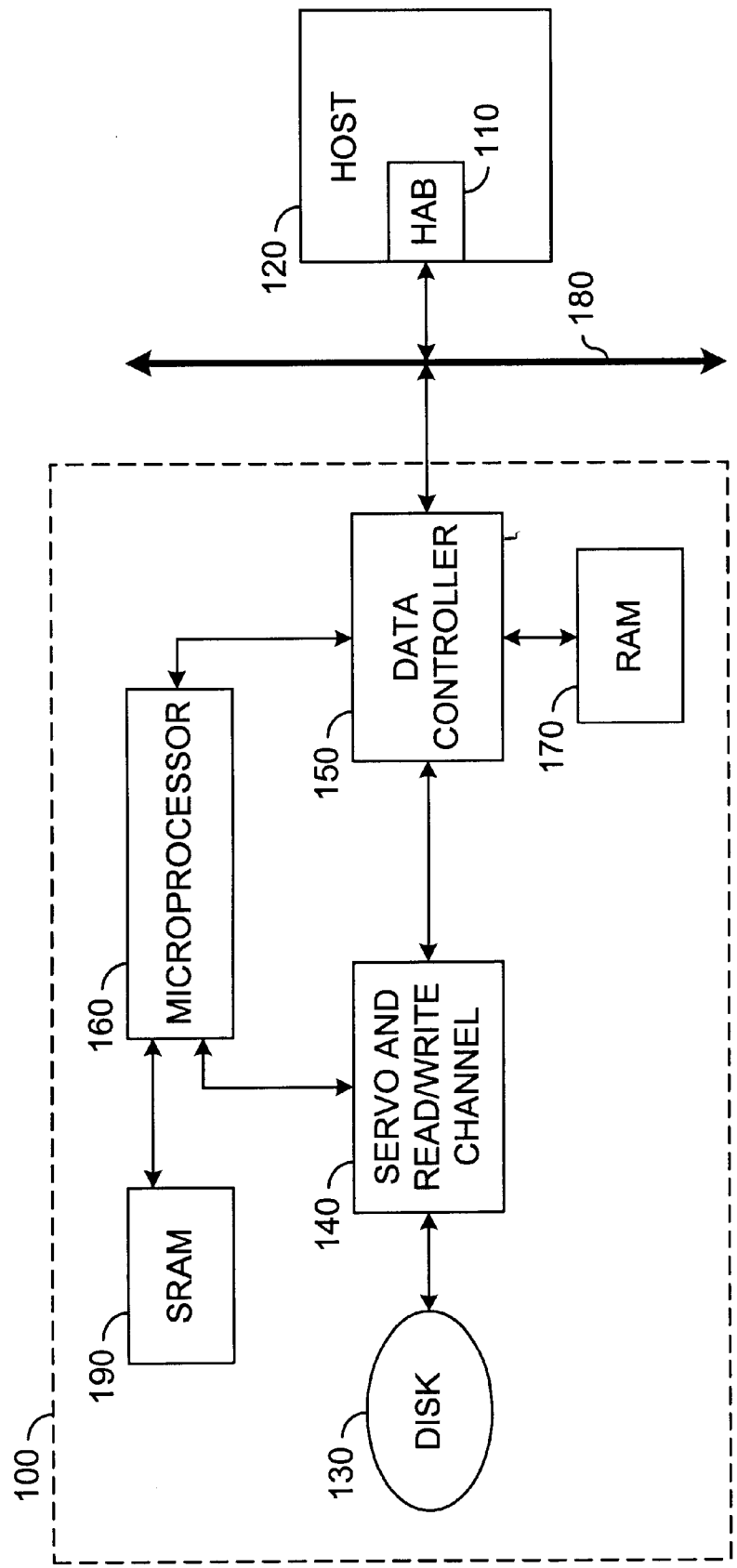
FIG. 1 is a block diagram of a peripheral device coupled to host via a peripheral bus.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

Figure 2:
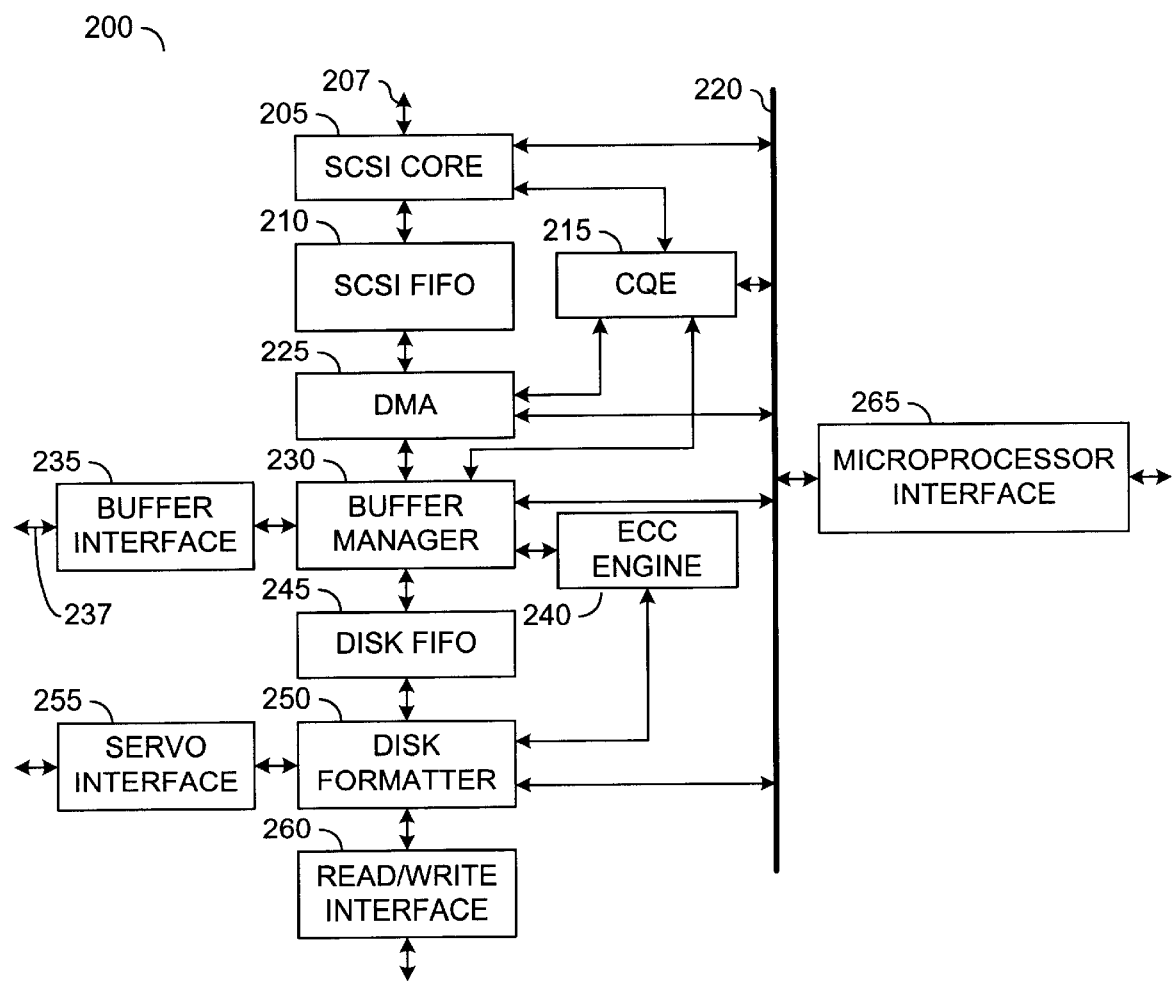
FIG. 2 is a block diagram of a data controller including the present invention.

FIG. 2 shows a block diagram of a data controller 200 according to the present invention. Data controller 200 can be substituted for data controller 150 in FIG. 1. Data controller 200, which is used in a hard drive, preferably includes a SCSI core 205 that is coupled to a SCSI peripheral bus (e.g., bus 180 in FIG. 1) via a bus 207. SCSI core 205 is also coupled to a SCSI FIFO 210, a command queuing engine ("CQE") 215 and a bus 220. A DMA block 225 is coupled to SCSI FIFO 210, CQE 215, bus 220 and a buffer manager 230. Buffer manager 230 is coupled to buffer interface 235, ECC engine 240, disk FIFO 245 and bus 220. Buffer interface 235 is coupled to a buffer memory, such as RAM 170 in FIG. 1, via a bus 237. Disk FIFO 245 is coupled to a disk formatter 250. Disk formatter 250 is coupled to a servo interface 255, a read/write channel interface 260, ECC engine 240 and bus 220. Servo and read/write channel interfaces 255, 260 are respectively coupled to servo logic and a read/write channel, such as servo and read/write channel 140 shown in FIG. 1. Bus 220 is coupled to a microprocessor interface 265 that is coupled to a microprocessor such as that shown in FIG. 1. The microprocessor can be an Intel-based 80×86 type microprocessor or functional equivalent, or can be an Intel-based 80C5x type microcontroller or functional equivalent. Alternatively, the microprocessor can be a digital signal processor, such as a Texas Instrument-based TMS b 320xx type DSP or functional equivalent. Although shown as a separate block for ease of description, CQE 215 is preferably included in SCSI core 205 and DMA 225, and utilizes buffer memory, e.g., RAM 170 in FIG. 1.

Figure 3:
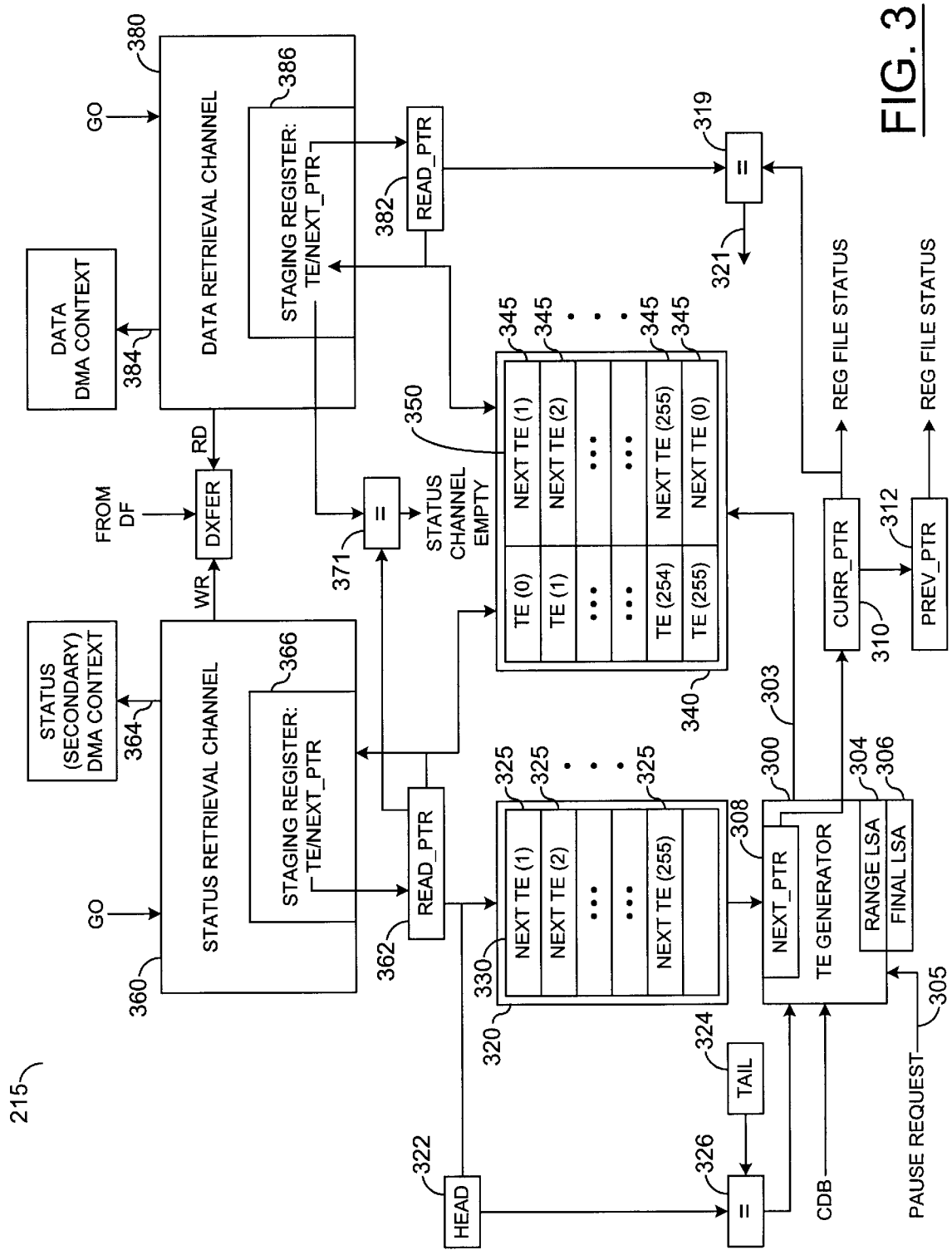
FIG. 3 is a block diagram of a command queuing engine of the present invention shown in FIG. 2.

FIG. 3 shows a block diagram of a preferred embodiment of CQE 215 that generally includes a TE generator 300, a free pointers list storage device 320, a TE list storage device 340, a status retrieval channel 360 and a data retrieval channel 380. Physically, CQE 215 is preferably partitioned into SCSI and DMA related blocks. TE generator 300 is located in SCSI core 205 of FIG. 2 and its configuration, status and interrupt information are integrated into the registers located in that block. The retrieval channels 360, 380 and a buffer table control logic for lists 330, 350 in devices 320, 340 are located in DMA block 225 in FIG. 2 and their configuration, status and interrupt information are integrated into registers in that block. Free pointers list storage device 320 preferably is located in buffer memory, such as RAM 170 in FIG. 1, but can be located in any other memory accessible by the data controller or the microprocessor.

For purposes of the present invention, a single command or a group of sequential commands create a thread. Commands having LBAs within a certain range are sequential. Commands having LBAs that are one apart are immediately sequential. For write commands, only immediately sequential commands are preferably handled. To determine whether the command is a read or a write, the opcode in the CDB is examined.

Figure 5:
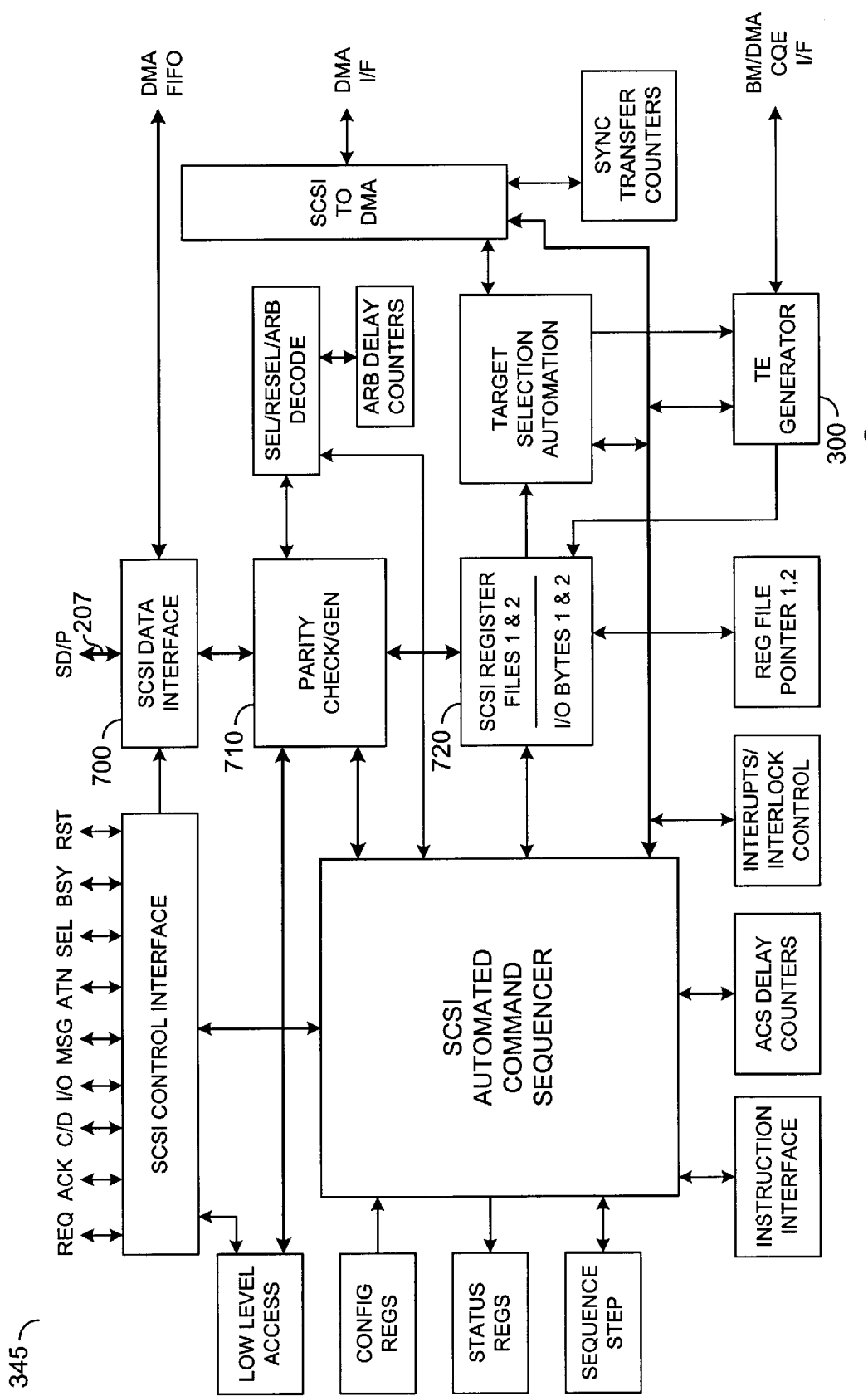
FIG. 5 is a block diagram of a portion of the SCSI core shown in FIG. 2.

Generally, when information is received from bus 207, that information is stored in register files, firmware saves some of that information and TE generator 300 parses that stored information and generates corresponding TE entries 345 that are stored in a TE list 350 in TE list storage device 340. Referring to FIG. 5 bus 207 transfers information with a SCSI data interface 700. The information is transferred between SCSI data interface 700 and register files 720, preferably two, via a parity check/generator 710. TE generator 300 accesses the information stored in register files 720 to create TE entries 345.

Register files 720 can be loaded by a selection initiated by an initiator or the SCSI bus. When the peripheral device that includes the present invention is selected, one of register files 720 is marked as reserved and loaded with the selection information from bus 207. This information includes the initiator ID, Identify message, Queue Code and Tag, CDB and selection status. Selection status information is provided in either address 0CA0h or 0CD0h in register files 720 which are explained below. If the CDB has a recognized opcode, the selection information is loaded with consistent positioning, and a transfer length of 0 on a 6-byte command preferably will be converted to 100h (for example, the LBA is loaded into bytes 9:6 with any upper bytes not supplied by the CDB pre-reset to zero). Note that the present invention is not limited to a 6-byte command, but can be modified to operate with 10-, 12- and 16-byte commands, for example. If the opcode is not one of the recognized opcodes, the CDB bytes are placed in order during a selection, starting with byte 4.

FIG. 7 lists the bytes in register files 720. Each addressed location of register files 720 can be considered a register. The information in S_SRF1 address 0C94h (associated with a first register file 720) and in S_SRF2 address 0CC4h (associated with a second register file 720) represents the respective register file status. Such status information includes whether the initiator selected the peripheral device without specifying its ID and how the CDB bytes were loaded into the register file, i.e., either in or out of order of receipt.

The status bytes at the end of register files 720 preferably are not loaded with transfer data and cannot be used to send or receive data. The information in S_SRF1 address 0C98h and in S_SRF2 address 0CC8h is the lower word of the previous final LSA. This information is copied from the register shown in FIG. 8B explained below) prior to that register being updated from the information in the current CDB. The microprocessor preferably stores this information with the CDB in its local storage (e.g., SRAM coupled to the microprocessor) and compares it with the LSA of non-sequential Read/Write commands as they arrive to determine if they continue a previous thread. If a new command continues a previous thread, the TE List 330 can be re-linked to connect it to this thread (explained below).

The information in S_SRF1 address 0C9Ah and in S_SRF2 address 0CCAh is the most significant sixteen bits of the Previous Final LSA. This register is copied from the register shown in FIG. 8 (explained below) prior to that register being updated from the information in the current CDB.

The information in S_SRF1 address 0C9Ch and in S_SRF2 address 0CCCh is the TE current pointer. Each of these registers contains the lower 15 bits of the buffer address for the TE entry 345 generated for the current command. These bits can be appended to the TE Table Base Address to determine the absolute buffer address. Preferably, the lower 3 bits in this register will always be zero as TE entries 345 are aligned on even double-word boundaries. The microprocessor preferably stores this field with the CDB in its local storage to enable the firmware to quickly locate the first TE in any thread.

The information in S_SRF1 address 0C9Eh and in S_SRF2 address 0CCEh is the TE Previous Pointer. Stored are the lower fifteen bits of the buffer address for the TE entry 345 generated for the previous command. These bits can be appended to the TE Table Base Address to determine the absolute buffer address. Preferably, the lower 3 bits in this register will always be zero as TE entries are aligned on even double-word boundaries. The microprocessor preferably stores this field with the previously active thread's CDB in its local storage to enable the firmware to quickly locate the last TE in any thread.

The information in S_SRF1 address 0CA0h and in S_SRF2 address 0CD0h is a CQE 215 status word. Information in this word includes whether the present command is recognized by CQE 215 as being sequential to the previous command received. The information also includes that a TE entry 345 was written to TE List 350 by TE generator 300. In addition, the information includes that a TE entry 345 related to the command currently in the associated register file 720 is still being written to the buffer (write-in-progress). On a selection interrupt, the microprocessor preferably polls for this write-in-progress information to be cleared before accessing a TE entry 345 from the buffer.

The previous final LBA can be used by the microprocessor to track multiple threads as they arrive by keeping track of the final LBA for each thread in the queue. The firmware can use this information to detect when new threads are really continuations of existing threads and reorder the queue to continue a disk related thread. The firmware could separate the non-disk threads into separate queues which could become the automated queue once the firmware decides to change the DF context. The firmware may be programmed to always know the buffer address of the first and last TE of every thread.

The mapping of register files 720 has the double word fields (LBA and Length) aligned on double-word boundaries. The order in which bytes are received into a register file 720 and their associated register addresses are shown in FIG. 7B. Once the microprocessor has finished reviewing or storing these bytes, the associated reservation bit for the register file 720 should be cleared so that the register file can be used for a new bus initiated selection.

Returning to FIG. 3, each TE entry 345 includes a TE (x) and a free pointer shown as Next TE(x). For purposes of the present invention, however, each TE entry 345 includes the TE(x) and the Next TE(x). Free pointers 325 in free pointers list 330—stored in free pointers list storage device 320— provide free pointers 325 that are used by TE generator 300 to create links for, and are included in, TE entries 345. Status retrieval channel 360 (for disk writes) and data retrieval channel 380 (disk reads and cached writes) recycle these pointers as TE entries 345 are discarded. TE entries 345 are discarded once data and status retrieval channels 380, 360 have finished programming the DMA status or data contexts or, if no contexts are required, have finished the function requested by a TE entry 345.

Free pointers list 330 is a buffer table, stack or queue of free pointers 325 that are 15-bit pointers. Each free pointer 325 is appended to a TE Base Address to provide an address to TE list storage device 340 for insertion of a TE entry 345 into TE list 350. The address is as follows:

| TE Base Addr(6:0) | Free Pointer(14:0) |
| --- | --- |

The spacing of free pointers 325 is dependent on the width of TE entries 345. Since TE entries 345 are preferably each 8 bytes wide, free pointers 325 should be spaced at least 8 bytes apart. TE entries 345 are preferably placed on even double-word boundaries. For purposes of the present invention, a word is 16 bits wide. However, the present invention is not limited to that width. Since free pointers Next TE (1), ..., Next TE (255) are byte addresses, they can be used by the microprocessor to directly access the bytes of TE entries 345 in TE list storage device 340.

Initially, the microprocessor enters free pointers 325 into free pointers list 330 which are available for TE generator 300 to use in generating links for TE entries 345. The size of free pointers list 330 is preferably configurable to 256, 512, 1 k or 2 k word entries. Other configuration sizes are within the scope of the present invention. Free pointer entries 325 are addressed by appending a configurable number of free base address bits with a tail or head pointer to create a byte address as follows:

| 256: | Free Base Addr(12:0) | Head/Tail(8:0) |
| 512: | Free Base Addr(12:1) | Head/Tail(9:0) |
| 1k:  | Free Base Addr(12:2) | Head/Tail(10:0) |
| 2k:  | Free Base Addr(12:3) | Head/Tail(11:0) |

The microprocessor initializes a head pointer in a head pointer register 322 to the free pointer entry 325 immediately following the last available free pointer entry 325. During TE entry 345 retrieval, status retrieval channel 360 increments the head pointer as it discards TE entries 345 and writes the corresponding free pointer 325 back into free pointers list 330. A tail pointer in tail pointer register 324 is retrieved by TE generator 300 to access the next free pointer entry 325 for the corresponding free pointer. The tail pointer is incremented by TE generator 300 as free pointers are retrieved. Head and tail pointer registers 322, 324 preferably automatically wrap on a power-of-2 ceiling back to zero.

The tail pointer is compared with the head pointer by comparator 326 to determine if the pointers are equal. If equal, free pointers list 330 is empty and, thus, TE list 350 is full. Note that the microprocessor can initially space the head and tail pointers apart by more than 8 bytes if additional information is desired to be placed next to or within TE entries 345 (for example, additional CDB derived information). Since an equality between the head and tail pointers is used to determine when free pointers list 330 is empty, the last free pointer entry 325 preferably is not initialized with a free pointer. This prevents that equality from occurring when free pointers list 330 is full. When 2k−1 free pointers exist, 2k−2 TE entries 345 can be created before TE list 350 is full.

TE generator 300 retrieves free pointers 325 from the free pointers list 330 and writes associated TE entries 345 for each CDB that is received and stored in register file 720. TE generator 300 generates a single TE entry 345 for every CDB received (preferably no exceptions). One exception is when a non-read/write command for which no automatic disconnect from the SCSI bus is allowed; this exception is programmable. Each TE entry 345 is made up of 4 words as shown in Table 1:

TABLE 1

| Word0 | P | Length (15) | QCode(1:0) | Stop | Stat | SRel | Data | Tag (7:0) |
| Word1 | P | Length(14:0) | | | | | | |
| Word2 | P | Next Pointer(14:0) | | | | | | |
| Word3 | P | Reserved(3:0) | | | DRel | Data Release Length(9:0) | | |

Word 0 contains: an 8-bit Queue Tag (Tag(7:0)) from the CDB; four control bits Stop, Stat, SRel and Data; an encoded Queue Code (QCode(1:0)) from the command (00b=Simple, 01b=HofQ, 10b=Ordered, 11b=Non-queued); and the upper bit of the transfer length field included in the CDB. Word 1 contains the lower 15 bits of the transfer length (in sectors—LSAs) for that CDB. Word 2 contains a next pointer (Next Pointer(14:0)) that points to the next TE entry 345 in TE list 350. Word 3 contains 4 reserved bits (Reserved(3:0)), 1 control bit DRel, and the length (Data Release Length (9:0)—in sectors) to release on a skipped read-hit for cached reads. The most significant bit of each word is a parity bit P.

Queue Tag is an identifier that is specific to and supplied by a host or initiator. Queue Code signifies whether the present command should be handled in the order it was received (Ordered), placed at the head of the queue (HofQ), handled in a manner the controller determines (simple) or not placed in the queue (Non-queued).

The five control bits are defined as follows: DRel indicates to automatically stop and release sectors by the number of sectors in the Data Release Length, SRel indicates to wait until the disk completes the transfer (responsive to a DXFER value in DXFER register 370 transitioning to zero) and then discard the corresponding TE entry 345, the Data bit denotes a data transfer, the Stat (status) bit denotes to send GOOD status using the secondary "status" context associated with status retrieval channel 360, and the Stop bit denotes to stop retrieval channels 360, 380 and cause an interrupt to the microprocessor.

Status retrieval channel 360 along with the SRel (used when DXFER=0) and Status control bits exist primarily for automatically sending GOOD status on non-cached writes after the data has been completely written to the disk (note that the DMA can send other status besides GOOD) and to interrupt the microprocessor on cached and non-cached writes. With this feature, data retrieval channel 380 can proceed to transfer data between the host and the buffer without to wait to send status while the data is written to the disk.

The stop bit overrides all other control bits and clears the TE retrieval GO bits provided from the DMA to retrieval channels 360, 380. The following table shows all of the possible control bit settings:

| DRel | Stop | Stat | SRel | Data | Action |
|---|---|---|---|---|---|
| 0 | 0 | 0 | 0 | 0 | Null - Just discard |
| 0 | 0 | 0 | 0 | 1 | Data channel transfers data |
| 0 | 0 | 0 | 1 | 0 | Status channel loads DXFER, waits for DXFER = 0, then discards TE |
| 0 | 0 | 0 | 1 | 1 | Status channel releases DXFER (no status), Data channel transfers data |
| 0 | 0 | 1 | x | 0 | Status channel loads DXFER, waits for DXFER = 0, then sends status |
| 0 | 0 | 1 | x | 1 | Status channel sends status after DXFER= 0, Data channel transfers data |

-continued

| DRe 1 | Stop | Stat | SRel | Data | Action |
|---|---|---|---|---|---|
| 1 | 0 | 0 | 0 | 0 | Data channel releases sectors (for skipped cache hits) |
| 1 | 0 | 0 | 0 | 1 | Data channel releases sectors then transfers data |
| 1 | 0 | 0 | 1 | 0 | Data channel releases sectors, Status channel releases DXFER |
| 1 | 0 | 0 | 1 | 1 | Data channel releases sectors then transfers data, Status channel sends status |
| 1 | 0 | 1 | x | 0 | Data channel releases sectors, Status channel sends status |
| 1 | 0 | 1 | x | 1 | Data channel releases sectors then transfers data, Status channel sends status |
| x | 1 | x | x | x | Clear the channel's GO bit when TE retrieved by that channel |

TE generator 300 is programmed to indicate that the transfer is either cached or non-cached. This programming assists in the creation of the control bits described above. Also, the present invention preferably switches automatically to non-cached mode from cached mode, for example, if the FUA bit is set for a write command.

The following table lists the types of TE entries which are created by the TE generator. Cached verses non-cached writes refer to whether SCSI Core 205 is configured to automatically program DMA contexts with the ability to send status after the DMA data transfer. Any TE entry 345 with a Stop bit also represents a command whose register file 720 is not automatically released and which generates a selection interrupt to the microprocessor.

| TE Control Bits Set | Type of Selection |
|---|---|
| Stop + Status + Data | Non-sequential non-cached write |
| Stop + SRel + Data | Non-sequential cached write |
| Stop + Data | Non-sequential read |
| Status + Data | Sequential non-cached write |
| Srel + Data | Sequential cached write |
| Drel + Data | Sequential read with skipped hit |
| Data | Sequential read with no skipped hit |
| Stop | Non-read/write command |

CQE 215 releases the current selection's register file 720 when bus 207 is released if the command was sequential. TE generator 300 decodes the CDB stored in register file 720 to determine if the command is a read/write command and if it is sequential to the previous command.

In particular, sequential commands are defined as commands whose parameters are the same except for their respective LSA, Queue Tag and length; however the LSA is within a predetermined range from the end of the previous command's transfer LSA. TE generator 300 also stores a range value in a range LSA register 304 included in TE generator 300. This range value is preferably used only for read commands. For write commands, the range value is preferably zero since the write data is directly sequentially stored on the target medium. However, the range value can have a non-zero value if desired. For reads, the range value corresponds to the number of sectors per track. Preferably, the range value is chosen to prevent frequent track seeks between sequential commands.

A value of the fmal LBA of the last TE entry 345 is maintained in the register file 720. For every new CDB command that arrives, TE generator 300 compares the associated new LBA with the previous final LBA value to determine if the CDB contains a sequential or a non-sequential command. The TE generator 300 then generates a TE entry 345. Note that by examining the opcode and other command bits, the CQE determines if it can handle that command. If a new command is sequential, then TE generator 300 adds a new data and/or status TE entry 345 to the queue and updates the final LBA value to the sum of the new command's LBA and transfer length value. Register file 720 containing the CDB is then released without a selection interrupt.

If the new command is a non-sequential command, then TE generator 300 adds a new data and/or status TE entry 345 to the corresponding queue or TE list with the Stop bit set, and updates the final LBA value to the sum of the new command's LBA and transfer length value. However, the register file containing the CDB is not released, TE generator 300's previous final LBA, current pointer and previous pointer values are latched with the CDB, and a selection interrupt is generated to the microprocessor. If the new command is not a read/write command or cannot be handled by CQE 215, TE generator 300 adds a new TE entry 345 with the Stop bit set to the TE entry list 350 (queue), does not release register file 720, and an interrupt is generated to the microprocessor.

TE generator can be paused by setting a bit that is transmitted over lead 305 (FIG. 3) to TE generator 300. That bit will guarantee that TE generator 300 is not generating a new TE entry while, for example, the microprocessor is in the process of changing TE list 330 or the characteristics of TE generator 300 sequential fields.

FIG. 8 shows the sequential fields register. This register is automatically updated by CQE 215 when a TE is generated. When Bit 12 "EnSeq" (Enable Sequential) is set, the next command is allowed to be sequential if all other sequential aspects are also enabled. If this bit is cleared, the next command received will be forced to be non-sequential. If a command is received which either is not a Read/Write command, this bit is cleared to prevent the next command received from being sequential. This bit can be used at t=0 to start CQE 215 with a non-sequential command. The selection interrupt will be generated to inform the firmware what to do.

When Bit 7 "CqeNaca" NACA in Current CQE Thread) is set, all of the commands in the current thread have had the NACA bit set. If a command is received with the NACA bit cleared, CQE 215 will treat this as a new non-sequential thread and generate a selection interrupt. If this bit is cleared and a command is received with the NACA bit set, it will also be treated as non-sequential.

When Bit 6, "CqeRead" (Current CQE Thread is a Read) is set, the current CQE thread is a Read thread. When this bit is cleared, the current CQE thread is a Write thread. If a command is received whose Read/Write sense is not the same as this bit indicates, CQE 215 will treat this as a new non-sequential thread and generate a selection interrupt. When a non-Read/Write command is received, the thread information is not changed (including all the bits in this register). This allows easy restart if a non read/write command is received in the middle of a read or a write thread. Referring to Bits 5–4 "CqeQcode" (Queue Code of Current CQE Thread), these two bits are used to indicate the Queue Code of the current thread. Again, the queue codes are simple, head of queue, ordered queue and untagged. As an option, any command whose Queue Code is not the same as these bits indicate will be treated by CQE 215 as a new non-sequential thread and the selection interrupt will be generated. Bits 3–0 "CqeInitID (Initiator ID in Current CQE Thread) contain the initiator ID for the current thread. If the initiator ID in a new selection is not the same as these bits indicate, CQE 215 will treat this as a new non-sequential thread and generate a selection interrupt.

FIGS. 8B and 8C show registers that store CQE 215 final LSA field. These registers are automatically updated by CQE 215 when a TE is generated. Bits 15–0 of both registers shown in FIGS. 8B and 8C respectively constitute the lower and upper word of CQE 215 Final LSA field. It is the last Logical Sector Address (LSA) of the previous command plus 1. The LSA is the command LBA multiplied by the number of physical sectors per LBA. When a new command is received, this field is updated by adding the command's Transfer Length and LBA, then converting to a Logical Sector Address. The Final LSA is compared against the start LSA of a new command to determine if the new command is sequential. If the new LSA is not equal to or within the configured range from the Final LSA, CQE 215 will treat this as a new non-sequential thread and generate a selection interrupt.

FIG. 8D shows a CQE status register. All the bits except for bit 10 are transitional bits and are for information only. These bits get set and cleared by hardware dynamically as TE generator 300 processes commands. When Bit 11, "NxtPtrVld" (Next Pointer Valid) is set, TE generator 300 has successfully prefetched a new free pointer from the free pointers list 330 into the TE generator's next pointer register 308. This is preferably required before TE generator 300 will be able to handle a new command since the next pointer register 308 supplies the next pointer link for the next TE entry 345. If the bit is not set, an interrupt is generated when the command arrives. When the microprocessor requests to pause TE generator 300, it can poll this bit to determine when free pointers list 330 is stable with regard to TE generator 330.

When Bit 9, "SeqCmnd" (Current Command is Sequential) is set, the command that TE generator 300 is currently processing has been detected as being sequential to the previous command. When Bit 8, "RWCmnd" (Current Command is a Read or Write Command) is set, the command that TE generator 300 is currently processing has been detected as being a CQE Read/Write command. When Bit 4, "TEGip" (TE Generation in Progress) is set, TE generator 300 is currently building a TE entry 345 in the buffer. This bit is set after a CDB has been successfully received. This bit is cleared once TE generator 300 has finished building the TE entry 345 in the buffer. When the microprocessor requests to pause TE generator 300, it can poll for this bit being cleared to indicate when TE List 330 and CQE Sequential Fields (described above) are stable with regard to TE generator 300.

When Bit 3, "CAF" (Current Command will Auto-Free the SCSI Register File) is set, the command that TE generator 300 is currently processing will not generate a Selection Interrupt and will automatically free the associated register file after its TE entry 345 has been generated and the SCSI bus released. When Bit 2, "TEFull" (TE List is Full) is set, TE List 350 in the buffer is full. This condition occurs when free pointers list 330 is empty as determined by comparing the free pointers list head and tail pointers.

When Bit 1, "DTEEofQ" (Data TE Pointer has Reached End of Queue (data empty)), is set, the Data Retrieval Channel's Read Pointer has reached the end of TE List 350 (is equal to the TE generator's Current Pointer) and has nothing more to do. This condition occurs as soon as the last Data DMA context is programmed and does not indicate that the DMA is complete with the last data context programmed. When Bit 0, "STEEofQ" (Status TE Pointer has Reached End of Queue (status empty)), is set, the Status Retrieval Channel's Read Pointer has reached the end of TE List 350 (is equal to the Data Retrieval Channel's Text Pointer) and has nothing more to do. This condition occurs as soon as the last Status DMA context is programmed and does not indicate that the DMA is complete with the last status context programmed.

The firmware preferably maintains certain parameters in its own separate Transfer Control Block (TCB) list. These parameters include:

1. Command information derived from the first command of the thread (initiator ID, read/write, QTag, LBA, length, NACA and all other information in register file 720);
2. Pointer to the first and last TE entries of the thread; and
3. First and final LBAs of the thread.

The firmware can derive those parameters from the information stored in the register file. When a new thread is received, a selection interrupt is generated and the CDB is saved in one of register files 720. The microprocessor moves the information in register file 720 to its local storage. The microprocessor builds the TCB with the command information, starting LBA, and first TE entry (also saved in one of register files 720). Also saved in the register file 720 is the Final LSA of the previous thread received; the firmware can store this as the Final LSA to the TCB received previously. The firmware can also derive the last TE pointer from the previous TE pointer which is saved in the register files. With this information, each TCB represents a thread be of sequential commands.

Whenever a new command is received that is not sequential to the previous command, a selection interrupt occurs. The firmware can compare the starting LSA for the command with the final LSA of all the TCBs to determine if it is sequential to an existing thread. If it is, the firmware can change the next pointer of the current last TE entry 345 with the address of the new last TE entry 345 to connect the new command with the thread. The next pointer of the new last TE entry 345 can point to a null entry or the first TE entry 345 of another thread. The appropriate TCB can be updated with the address pointer to the new last TE entry 345 and with the new final LSA. By following this methodology, the firmware has the information to keep commands within a thread connected and to manage exceptions.

To illustrate, prior to the reception and storage of a CDB in one of register files 720, there are no valid values in the final LSA register 306 and Prev_Ptr 312 of FIG. 3 while the value in Curr_Ptr 310 is zero. Assume that this CDB is the first CDB received. The CDB has command characteristics of Initiator A, a write opcode, QTag=1, start LSA=0 and a transfer length ("LEN")=2. Referring to FIG. 9, final LSA register 306 has a value of 2, and the pointer registers 310, 312 maintain their respective values. As shown in FIG. 9, the previous final LSA saved in register file 720 is the previous value stored in final LSA register 306. In this instance, that previous value is not valid as illustrated by the X. Also, the values of Curr_Ptr and Prev_Ptr 310, 312 are reflected in register file 720.

Since this CDB was the first received, there is no valid value in the fmal LBA register to compare to the start LBA value. Therefore, a selection interrupt to the microprocessor (firmware) is generated. The firmware reads the register file 720 to create a first TCB1. TCB 1 is shown as saving a first TE and LSA values that are retrieved from the current pointer and the LSA values saved in register file 720. The last TE and final LSA values are not saved until an end of a thread is detected. The register file 720 is then released for further use.

The next CDB received has command characteristics of Initiator A, a write opcode, QTag =2, start LSA=2 and LEN=3. Since the command characteristics are the same as the previous CDB and the LSA matches the final LSA, the command is sequential. Because the command is sequential, a selection interrupt is not generated and the register file 720 is released. Furthermore, the final LBA is set to five. The current pointer is incremented along with the previous pointer. Register file 720 stores the previous final LSA (5), and the current and previous pointers (1, 0). TCB1 does not update any of the shown stored values since the end of the thread has not been determined.

The third CDB to arrive has command characteristics of Initiator A, a write opcode, QTag=3, start LBA=1000 and LEN=1. This start LBA of 1000 is compared to the final LBA value of 5. The inequality causes a selection interrupt to the firmware, which creates a second TCB2 to start this new command thread. Note that, for example, had either the initiator or opcode been different from the previous CDB, the present CDB would be treated as a non-sequential command. As shown, the final LSA is 1001, the current and previous pointers are 2 and 1, respectively. In register 720, the previous final LSA stored is 5, while the current and previous pointers are 2 and 1, respectively. TCB1 is closed by storing the previous pointer value of 1 as the last TE and storing the previous final LSA value of 5 as the final LSA. A TCB2 is created that has a first TE value of 2 that corresponds to the current pointer value and a first LSA of 1000 that corresponds to the LSA of the third CDB.

A fourth CDB to arrive has command characteristics of Initiator A, a write opcode, QTag=4, start LBA=5 and LEN=1. This start LBA of 5 is compared to the final LSA value of 1001. The inequality causes a selection interrupt to the firmware, which creates a third TCB3 to start this new command thread. As shown in FIG. 9, the first TE is set to the current pointer value of 3. The first LSA is set to the LSA value of 5. TCB2 is closed by storing the previous pointer value of 2 as the last TE and storing the previous final LSA value of 1001 as the final LSA.

Note that the fourth CDB's LSA value of 5 is equal to the final LSA value of 5 in TCB1. As an option, the firmware can link this fourth CDB to that TCB by accessing TE list 350 with the address from the last TE stored in TCB 1. The firmware can then modify the Next TE value in the associated TE entry 345 to the address of the TE that corresponds to the current (fourth) CDB. When all the commands for TCB 1 have been received, the last TE entry 345 will have its Stop bit set and the Next TE will be set to the address of TE list 350 that has the first TE entry 345 for TCB 2.

Alternatively, the Next TE can be set to a null value. All necessary values stored in TCB 1 and TCB 2 will be updated.

If the fourth CDB is sequential but the data transfer associated to TCB 1 has been executed and TCB 1 has been released by the firmware, the fourth CDB will not be linked to TCB 1. Instead, a third TCB 3 will be created as shown in FIG. 9. All the necessary values in TCB 2 will be updated. Regardless of which alternative is used for the fourth CDB, the final LBA value, the current pointer and the previous pointer values are updated.

The discussion above equally applies to immediately sequential read commands. For commands that are not immediate sequential, TE generator 300 uses the range value stored in range LSA register 304 to determine if the commands are in fact immediately sequential. For instance, assume that a range value is eleven, and a fifth CDB is received in the example explained above that has an LSA of ten. TE generator 300 will compare that LSA with the final LSA value of six in view of the range value. One way the comparison can be accomplished is by subtracting the final LSA from the LSA. Then, subtracting the range value from that difference and determining if the new difference is less than zero. If so, the CDB is sequential. The present invention, however, is not limited to the manner of the comparison.

For purposes of the previous discussion, all logical addresses are quantified as LSAs. Preferably, register files 720 and the TCBs store LBAs. TE generator 300 converts the LBAs to LSAs. However, the present invention is not limited to whether a logical address is stored as an LBA or an LSA.

Figure 10:
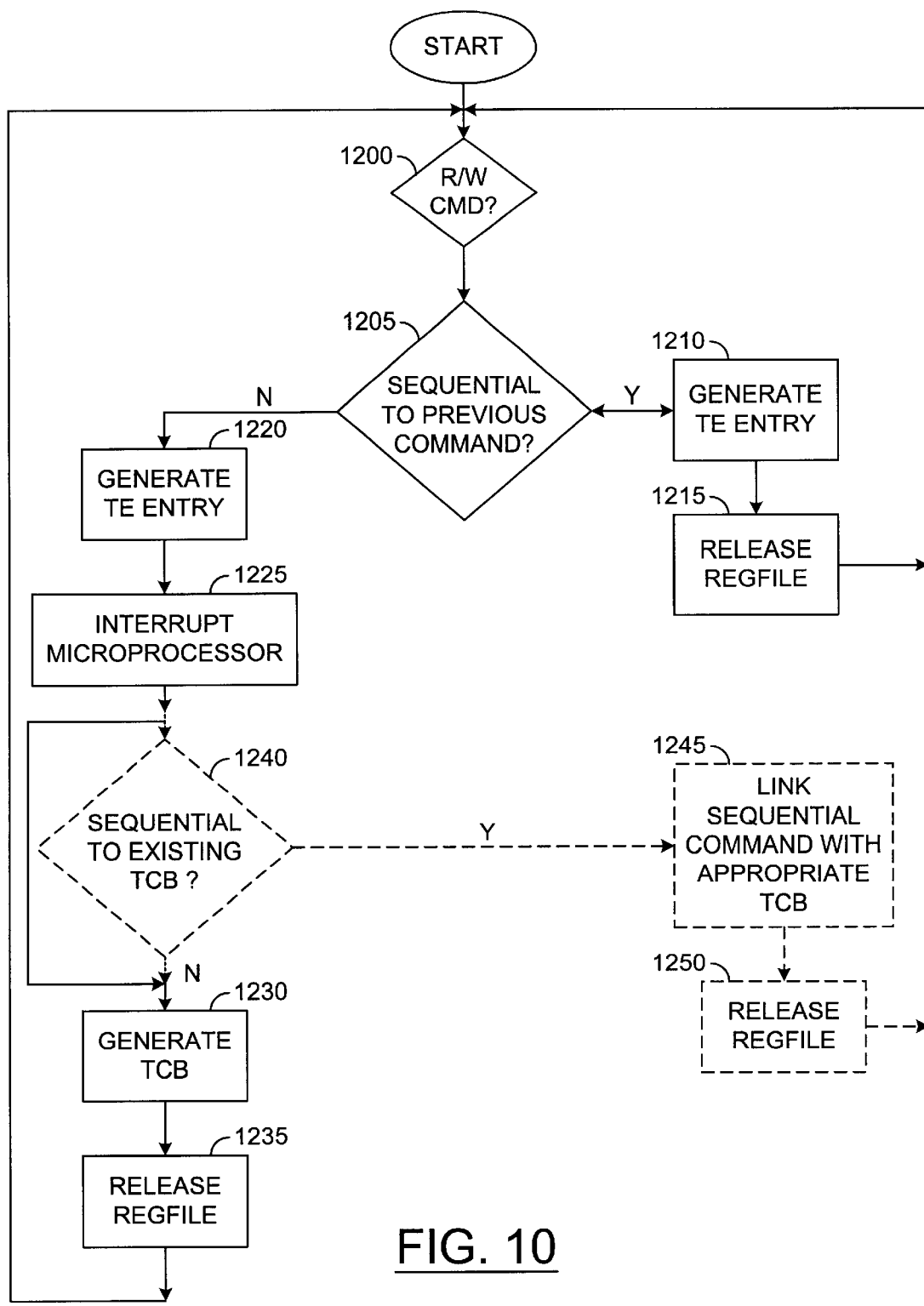
FIG. 10 is a flow diagram of a method for generating TE entries and TCBs according to the present invention.

A method of the present invention that corresponds to the above discussion can be generalized. Referring to FIG. 10, a determination is made at 1200 whether a new command is a read or a write command. If neither, a selection interrupt is generated. At 1205, a determination is made whether the command is sequential to a previous command. If yes, the method proceeds to 1210 where a TE entry is generated. Next at 1215, the register file is released. If the command or CDB is not sequential, then at 1220 a TE entry is generated that corresponds to the new command or CDB. At 1225 a selection interrupt is generated and at 1230 a new TCB is generated for that new command or CDB. At 1235, the register file is released.

As an option, the firmware can compare the new command or CDB with the final LSAs of the other TCBs stored in local memory of the microprocessor. This option is shown by the dashed lines in FIG. 10. At 1240, a determination is made whether the new command or CDB is sequential to an existing TCB. If no, then the method proceeds to 1230. If yes, the method proceeds to 1245 where the microprocessor links that TE entry with the last TE entry of the sequential TCB. The register file is released at 1250.

Each command which is sequential to the previous command can be handled by CQE 215 with no microprocessor intervention. The sequential command stored in one of register files 720 is discarded after the corresponding TE entry 345 is generated. The next TE pointer (shown in FIG. 3 as Next TE (0), . . . , Next TE (255)) in each TE entry 345 is written from the TE generator 300's next pointer value stored in Next_Ptr register 308 which contains the free pointer last retrieved from the free pointers list 330. When a TE entry 345 is written to TE list 350, the current pointer stored in Curr_Ptr register 310 is moved to a Prev_Ptr register 312, the next pointer is moved to Curr_Ptr register 310, and register 308 is loaded with the next free pointer of free pointers list 330. TE entries 345 are written to TE list 350 at the address created by appending the current pointer with a TE base address. The current and previous pointer values are saved with the CDB as a TCB to allow the firmware to quickly locate first and last TE entries 345 of each thread. The current pointer in TE generator 300 is preferably initialized by firmware for the first TE entry 345 corresponding to the first received CDB.

In more detail, CQE 215 manages free pointers 325 that are available for writing TE entries 345 to TE list 350. Free pointer entries 325 are saved in buffer memory as a queue. The head pointer value points to the address of free pointer list 330 where the next free pointer will be written when that pointer is no longer used. The tail pointer value points to the next free pointer entry 325 that will be used. For each new free pointer value saved to free pointer list 330, the head pointer value is incremented. For each free pointer entry used, the tail pointer value is incremented.

Figure 4:
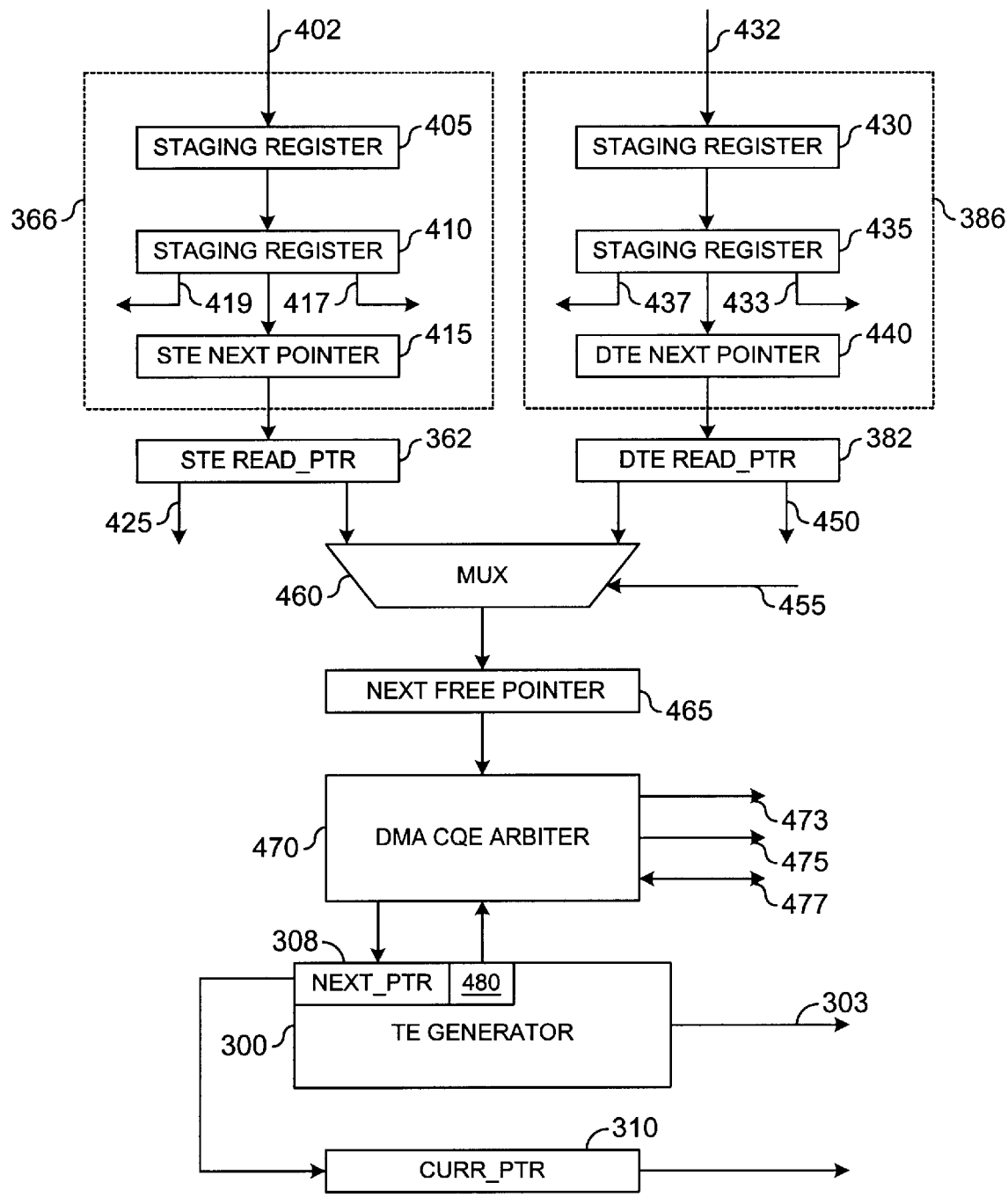
FIG. 4 is a block diagram for TE entry execution.

When TE generator 300 generates a TE entry 345, there should be at least two free pointers available: a first free pointer associated with the current TE and a second free pointer that is included in the current TE that points to the next TE entry 345. Referring to FIG. 4, two staging registers 405, 410, both preferably double-word wide, STE Next Pointer register 415 and STE Read Pointer register 362 are coupled in a cascaded configuration as shown. Registers 405, 410, 415 are included in status retrieval channel 360 of FIG. 3. Staging register 405 is coupled to TE list storage device 340 via a lead 402 to receive from TE list 350 a TE entry 345. TE entry 345 is accessed responsive to the pointer in STE Read Pointer 362, which provides the pointer via a lead 425. Staging register 410 provides information via lead 419 to program the status context. The information includes the length value of the data transfer. Staging register 410 also programs that length value to DXFER register 370 (FIG. 3) via lead 417.

Two staging registers 430, 435, both preferably double-word wide, DTE Next Pointer register 440 and DTE Read Pointer 382 are coupled in a cascaded configuration as shown. Registers 430, 435, 440 are included in data retrieval channel 380 of FIG. 3. Staging register 430 is coupled to TE list storage device 340 via a lead 432 to receive from TE list 350 a TE entry 345. TE entry 345 is accessed responsive to the pointer in DTE Read Pointer 382, which provides the pointer via a lead 450. Staging register 435 provides information via lead 433 to program the data context. The information includes the length value of the data transfer. Staging register 435 also programs that length value to DXFER register 370 (FIG. 3) via lead 437.

Both DTE and STE Read Pointer registers 362, 382 are coupled to a MUX 460. MUX 460 is controlled by DMA 225 via a lead 455. MUX 460 is coupled to a Next Free Pointer register 465 that is also coupled to a DMA CQE Arbiter 470. Arbiter 470 is coupled to buffer manager 230 via leads 473, 475 and is coupled to buffer memory via a lead 477. Buffer data is transferred between arbiter 470 and the buffer memory via lead 477. Load and store requests are provided from arbiter 470 to buffer manager 230 via leads 473, 475. TE generator 300 is coupled to arbiter 470.

A free pointer designated as a current pointer that points to the current TE entry 345 is stored in a Curr_Ptr register 310. A free pointer designated as a next pointer that points to the next TE entry 345 and is included in the current TE entry 345 is stored in a Next_Ptr register 308. The next pointer should be valid to store a TE entry 345 (the current pointer is valid by default). To indicate that the next pointer is valid, a valid bit 480 associated with the next pointer is provided. If DMA 225 determines that valid bit 480 is cleared and free pointer list 330 is not empty, DMA 225 will request CQE arbiter 470 to load the next pointer to register 308. When that next pointer is loaded, DMA 225 sets the valid bit so that the current TE entry 345 can be stored to TE list 350. The current TE entry 345 is stored in TE list 350, valid bit 480 is cleared, and the next pointer from register 308 is loaded into register 310. Loading the next pointer from register 308 to register 310 preferably occurs when valid bit 480 was previously set.

A current pointer is returned to free pointers list 330 when DMA 225 is finished processing the associated TE. DMA 225 finishes processing a TE entry 345 when the associated command has been executed (loaded into a context) or discarded by the last retrieval channel 360, 380 that needs to use that TE entry 345. For a read command, data retrieval channel 380 returns the current pointer. For a write command, status retrieval channel 360 returns the current pointer. As explained above, the current pointer for the current TE entry 345 is stored in either status retrieval channel 360's STE read pointer register 362 or data retrieval channel 380's DTE read pointer register 382. Since the current TE entry 345 contains a next pointer as a link to the next TE entry 345, that next pointer is stored in either status retrieval channel 360's STE next pointer register 415 or data retrieval channel 380's DTE read pointer register 382.

After the command associated with the current TE entry 345 is loaded into a context or discarded, a next TE entry 345 is fetched from TE entry list 350 in the buffer memory. The pointer in either STE next pointer register 415 or DTE next pointer register 440 is moved to STE read pointer register 362 or DTE read pointer register 382, respectively. The used read pointer in either STE read pointer register 362 or DTE read pointer register 382 is loaded into a next free pointer register 465. To accomplish that loading, multiplexor 460 receives a select signal via lead 455 from DMA 225 to select which previous read pointer will be returned to free pointer list 330. This select signal is determined by the type of command thread that is being executed. As explained above, data retrieval channel 380 returns the free pointer for a read command and status retrieval channel 360 returns the free pointer for write commands. Preferably, a bit in DMA 255 is set or cleared in response to the type of thread currently executed.

The selected read pointer register 362, 382 then provides the used read pointer to next free pointer register 465. Once this is done, a request is made to CQE arbiter 470 to return the used read pointer to free pointer list 330 in buffer memory. Arbiter 470 then asserts a request to buffer manager 230 to return the used read pointer to the address provided by the head pointer. When the used read pointer is returned to free pointer list 330, the head pointer is incremented and the request to buffer manager 230 is cleared.

Data and status retrieval channels 360, 380 retrieve TE entries 345 from TE list 350 and program DMA contexts. Channels 360, 380 work in parallel and independently retrieve every TE entry 345 in TE list 350. Preferably, status retrieval channel 360 is processing a TE entry 345 that is immediately after the TE entry 345 that data retrieval channel 380 processed. In other words, the pointer in Read_Ptr register 382 always precedes the pointer in Read_Ptr register 362. Also, if the next pointer of data retrieval channel 380 equals the read pointer of status retrieval channel 360, the status channel is empty, i.e., there are no more TE entries 345 to process.

Data retrieval channel 360 programs a data context which is typically a disk context. A disk context is the context for a data transfer between the buffer memory and the SCSI bus that is the same thread DF 250 is currently executing. However, the data context can be set to any of the contexts except for the secondary context (explained below) when the secondary context is being used by status retrieval channel 360. A data context is used to transfer data or release read-skip data between the host and the buffer memory and optionally sends status (for reads and cached writes). Status retrieval channel 360 programs a status context which is always the secondary context. The status context is used to release sectors from the buffer memory that are associated to the values in DXFER 370 for writes and then to optionally send status (for non-cached writes). Retrieval channels 360, 380 can continue retrieving TE entries 345 from TE list 350 and programming DMA contexts for a sequential thread indefinitely without microprocessor intervention. Read pointers stored in Read_Ptr registers 362, 382 in each retrieval channel are appended with the TE base address to derive the address for reading the next TE entry.

Retrieval channels 360, 380 discard TE entries 345 as DMA contexts are programmed and then prefetch the next TE 345 into respective staging registers 405, 410 and 430, 435 while the DMA context is still active. When data retrieval channel 380 discards a TE entry 345 from staging registers 430, 435, the read pointer in Read_Ptr register 382 is stored to the free pointers list 330. Channel 380 then moves the next pointer stored in Next_Ptr register 440 into Read_Ptr register 382. When status retrieval channel 360 discards a TE entry from staging registers 405, 410, the read pointer in Read_Ptr register 362 is stored to free pointers list 330. Channel 360 then moves the next pointer in Next_Ptr register 415 into Read_Ptr register 362. Status TE entries 345 are discarded once the command associated thereto has been completely handled by both data and status channels 360, 380. This condition is detected when the valid bit (explained below) of status channel 360 is cleared and either the valid bit of data channel 380 is cleared or status channel 360 is not empty (the data channel has already moved on). The read pointers are preferably initialized by firmware for the first TE entries 345.

Both the status and data retrieval channels 360, 380 have a GO bit to enable automatic retrieval and execution of TE entries 345, and a context ID to associate data or status retrieval channels 360, 380 with a DMA context and optionally with the DF context (the status retrieval channel's context is preferably hard-coded to a secondary context). After the microprocessor programs the DF and DMA contexts, the microprocessor preferably sets the retrieval channel GO bits to begin retrieval of queued TE entries. CQE 215 automatically clears the GO bits when a retrieved TE entry 345 has the stop bit set. However, the TE entry 345 is not deleted until it is executed without a Stop bit set. This allows a status and/or data entry with the Stop bit set to be executed by clearing the Stop bit and then re-enabling the GO bits. Preferably, TE entries 345 without a Data, Stat, DRel, SRel or Stop bit set are defined as null entries and are simply fetched and then deleted. TE entries 345 preferably have the Stop bit set on the first entry of any new read/write command and for non-read/write commands. When stops occur, the microprocessor can reconfigure DMA and/or DF contexts for each new thread, separate out other threads than the disk thread or take the opportunity to handle a non-read/write command in the order received. As long as a new (non-sequential) thread or non-read/write command does not arrive, the GO bits will remain active until the microprocessor clears them. This allows CQE 215 to automatically continue associating new commands with a read ahead or previous write cache without microprocessor intervention. Since status retrieval channel 360 preferably does not retrieve TE entries 345 ahead of data retrieval channel 380, the microprocessor can always immediately set the status GO bit again immediately after it is cleared by a TE entry 345 with the Stop bit set. A busy bit exists for each channel to indicate when any pending buffer access has completed after the GO bit is cleared.

In more detail, staging registers 430, 435 are connected in a chain to allow 32 bit shifting. When DMA 225 determines to load a data TE entry 345 from TE entry list 350, DMA CQE arbiter 470 asserts a request to buffer manager 230 to load the requested data TE entry 345 into the data retrieval channel staging registers 430, 435 32 bits at a time with two shift pulses. A buffer manager acknowledge signal is used as the shift pulse to shift the 32 bits into staging registers 430, 435. The acknowledge signal is responsive to the DMA CQE arbiter request to load a TE entry 345 into data retrieval channel 380.

The current TE entry 345 stored in staging registers 430, 435 is checked by DMA 225 to determine what will be done with that TE entry 345. TE entry 345 is valid if one of the following bits is set: Stop, Data or Data Release (DRel). If none of those bits are set, TE entry 345 is discarded and the next TE entry 345 is retrieved. If the Stop bit is set, data retrieval channel 380 stops retrieving TE entries 345 and an interrupt is provided to the microprocessor to alert the firmware that the Stop bit is active. If the Data bit is set, the current TE entry 345 is for a valid data transfer and the information provided in the current TE entry 345 will be loaded into data context counters which control the transfer of data within data controller 200. When the data context counters are loaded, the current TE is discarded and the next TE in TE entry list 350 is fetched (retrieved). A set Data Release bit causes the data context to release host block release ("HBR") pulses to perform a skip which advances the Host Segment buffer memory pointers. This allows DMA 225 to automatically skip read data which is already in buffer memory that the host does not need.

Two control bits control data retrieval channel 380, a Data Valid bit and a Data Go bit. The Data Valid bit is set when a valid TE entry 345 is retrieved from TE entry list 350 stored in buffer memory. The Data Valid bit denotes that the data context counters can be loaded with the current TE entry 345 in staging registers 430, 435 when the previous data context is finished executing. When the data context counters are loaded, the Data Valid bit is cleared and the next pointer in register 440 is updated, which signals DMA 225 to retrieve the next TE entry 345 from TE entry list 350 in buffer memory. If the Data Stop bit is set, the Data Valid bit will not be cleared to prevent the loading of the TE information into the data context counters.

Staging registers 405, 410 are connected in a chain to allow 32 bit shifting. When DMA 225 determines to load a status TE entry 345 from TE entry list 350, DMA CQE arbiter 470 asserts a request to buffer manager 230 to load the requested status TE entry 345 into status retrieval channel staging registers 405, 410 32 bits at a time with two shift pulses. A buffer manager acknowledge signal is used as the shift pulse to shift the 32 bits into staging registers 405, 410. The acknowledge signal is responsive to the DMA CQE arbiter request to load a TE into status retrieval channel 360.

The current TE entry 345 stored in staging registers 405, 410 is checked by DMA 225 to determine what will be done with that TE entry 345. TE entry 345 is valid if one of the following bits is set: Stop, Status or Status Release (SRel). If none of those bits are set, TE entry 345 is discarded and the next TE entry 345 is retrieved. If the Stop bit is set, status retrieval channel 360 stops retrieving TE entries 345 and an interrupt is provided to the microprocessor to alert the firmware that the Stop bit is active. If the Status bit is set, the current TE entry 345 is for a valid data transfer and the information provided in the current TE entry 345 will be loaded into status context counters which control the transfer of data within data controller 200. When the status context counters are loaded, the current TE is discarded and the next TE in TE entry list 350 is fetched (retrieved). A set Status Release bit causes DXFER register 370 to be released without loading the status context counters. This allows DMA 225 to automatically account for the disk transfer pulses which DMA 225 does not need to send the status message. These features are used when status is provided to the host immediately after the transfer data by the data context, particularly for a read or cached write.

Two control bits control status retrieval channel 360, a Status Valid bit and a Status Go bit. A Status Go bit denotes that status retrieval channel 360 is enabled to retrieve status TE entries 345 from TE entry list 350 in buffer memory. The Status Valid bit is set when a valid TE entry 345 is retrieved from TE entry list 350 stored in buffer memory. The Status Valid bit denotes that the status context counters can be loaded with the current TE in staging registers 405, 410 when the previous status context is finished executing. When the status context counters are loaded, the Status Valid bit is cleared and the next pointer in register 415 is updated, which signals DMA 225 to retrieve the next TE entry 345 from TE entry list 350 in buffer memory. If the Status Stop bit is set, the Status Valid bit will not be cleared to prevent the loading of the TE information into the status context counters.

Since multiple requests can occur simultaneously, DMA CQE arbiter 470 determines the priorities and, hence, which request is issued to buffer manager 230. There are separate load signals which are generated for data and status retrieval channels 380, 360 to manage those channels since they operate independently. GO and Valid bits exist for each channel 360, 380. The GO bit is set (enabled) for each channel to retrieve and execute TE entries 345 in TE entry list 350 stored in buffer memory. The Valid bit is set when a valid TE entry 345 is loaded into the respective channel's staging registers. That loading signals DMA 225 to move the information of the TE entry 345 to the appropriate context counters when those counters are free to execute another command.

LoadSTE and LoadDTE signals are generated when the data or status TE entry list 350 is not empty, the current staged TE entry 345 does not have a Stop bit set, the Valid bit is cleared for the channel and the GO bit is set for that channel. A data TE list empty signal is generated by comparator 319 when the read pointer in DTE next pointer 440 is equal to the current pointer in Cuur_Ptr register 310 that is used for storing TE entries 345. The data TE list 350 is empty since that equality signifies that the next data TE entry 345 has not been provided to TE entry list 350. A status TE list empty signal is generated by comparator 371 when the current status TE read pointer in Read_Ptr 362 is equal to the next data TE pointer in DTE next pointer register 440. This signal prevents status retrieval channel 360 from passing data retrieval channel 380 since a status message is not sent before data is completely transferred. A set Stop bit in the TE entry 345 for either channel 360, 380 allows the command thread to terminate since this signal prevents further channel loading of TE entries 345 in respective staging registers. Also, an interrupt will be provided to the microprocessor responsive to the set Stop bit. The GO bit is used by firmware to control the execution of a command thread. That execution can be stopped if firmware clears the GO bit. A set Valid bit is an internal flag to DMA 225 that allows DMA 225 to determine the appropriate time to load the next TE entry 345 into the appropriate executing channel 360, 380.

If both the LoadSTE and LoadDTE signals are ready, DMA 225 will assert the LoadDTE request first because data transfer occurs before a status message. After this first request, status retrieval channel 360 will be allowed to request since data retrieval channel 380 will not be able to instantly reassert the LoadDTE signal. When both data and status TE entries 345 are staged, DMA 225 normally executes all TE entries 345 in the retrieval channel 380 until list 350 runs out of data (read) or space (write). At that point, DMA 225 executes TE entries 345 in the status TE entry list 350. Alternatively, firmware can configure CQE 215 to alternatively or interleavedly execute a staged data TE entry 345 with a staged status TE entry 345. In other words, channels 360, 380 execute the same TE list 350.

The contexts used for CQE 215 are Data and Status. The Data context can be any context except the secondary context while the Status context preferably always uses the secondary context. DMA 225 will always attempt to load the Data context into the active registers as a default since data transfer occurs before transmitting a status message to the initiator or host. The Status (Secondary) context is made active when DXFER counter 370 goes to zero and the Data context has reached a "clean boundary." DMA 225 achieves this activation by initiating a request to a DMA context controller to make the Status context active. When a context reaches a clean boundary, the conditions for the next context to execute are evaluated again. This process continues until both status and data TE entry lists 350 are empty.

Data and status retrieval channels 380, 360 interact differently for different commands. On a read command, status is sent by data retrieval channel 380 after data is placed into the buffer memory. The pulses transmitted from DF 250 for each transferred sector preferably is counted. DMA 225 will begin retrieving TE entries 345 and will program the Data context with a transfer and to send status. The Status context is not used, and the Status and SRel bits are cleared in TE entries 345. DMA 225 will retrieve data TE entries 345 and will load DXFER register 370 with the transfer length so the DBR (data block release) pulses are counted if the active host context is the same as the disk context. DMA 225 will load status TE entries 345 in the command thread but will discard them since TE entries 345 do not have an operating bit set for status retrieval channel 360. Although none of the status TE entries 345 are valid in a read command thread, DMA 225 does not load the status TE entry 345 before the data TE entry 345.

On a write command, DMA 225 uses both data and status retrieval channels 380, 360. Data TE entries 345 are loaded for the Data context and are executed as soon as possible. Status retrieval channel 360 will load status TE entries 345 and will load DXFER register 370, wait for DXFER to reach zero and then load the Secondary context with the status TE entry 345 to send a status message. Normally, data retrieval channel 380 is allowed to execute data TE entries 345 until buffer memory space is exhausted or is stopped for predetermined reasons, then status retrieval channel 360 will execute the status TE entries 345. Again, an alternative method allows channels 360, 380 to be configured to alternatively execute stages TE entries 345. This alternative method can be used to force channels 360, 380 to stay synchronized.

For cached writes to the buffer memory, a status message is sent as soon as all the data is received in the buffer memory, not when the data actually reaches the disk. In this case, the SRel bit is set in the status TE entry 345. DMA 225 operates the same as for a normal write, except the status message is sent earlier by the data context. Status retrieval channel 360 loads DXFER register 370 for every status TE entry 345 to account for the sector pulses from the disk, but will not send another status message since the status message was sent earlier.

The operation of channels 360, 380 begins with an inequality between the pointer in Read_Ptr register 382 and the pointer in Curr_Ptr register 310. The output of comparator 319 is provide to the microprocessor as an interrupt via a lead 321. The microprocessor then sets the GO bits of both channels 360, 380. Referring to FIG. 6A, a non-cached write (disk write) that has a thread of two TE entries 345 is graphically shown with time increasing from top to bottom. The pointer in Read_Ptr 382 is used to retrieve a first TE entry 345 that is loaded into staging registers 430, 435 (FIG. 4). The length of the data transfer is provided from staging register 435 to the microprocessor via lead 383 (FIG. 3). Other information, such as the QTag, is provided to the microprocessor so that firmware can use the corresponding TCB.

The Next TE pointer is provided from staging register 435 to DTE next pointer register 440 (FIG. 4). As shown under the DMA XFER heading, DMA starts transferring data D1 from the host to the buffer memory. Firmware sets up the context for this transfer based on the TCB that was identified by the information provided by channel 380 to the microprocessor. Thereafter, the TE entry 345 in staging registers 430, 435 is released, and the next TE pointer from DTE next pointer register is loaded into DTE Read_Ptr register 382. Since this is the last TE entry 345 of the thread, the Stop bit is set. When the transfer of data D1 is completed, the a. firmware notifies channel 380 that it is ready to accept the next data transfer length. This length, stored in staging register 435, is provided to the microprocessor along with the stop bit. DMA 225 then transfers data D2 as shown in FIG. 8A.

Concurrently, channel 360 is retrieving TE entries 345 that are one behind those of channel 380. Channel 360 programs DXFER register 370 with the length of the transfer that corresponds to each retrieved TE entry 345. However, FIG. 6A depicts a disk write. Therefore, status cannot be sent to the host until the data is actually written to the disk. To monitor that writing, each sector or data unit that is transferred to the disk will cause DF 250 to decrement the transfer length value in DXFER register 370 by one. Once all the data is written for that TE entry 345, the transfer length value in DXFER register 370 is zero (as shown after the DF 250 transfer corresponding to D1) so that status retrieval channel 360 notifies the firmware that the transfer is complete. The context then sends status to the host. This feature is shown by the time span S1 under the DMA XFER heading. Note that S1 follows DF 250 data transfer. The transfer of S2 is the same as S1.

In more detail, for the first write received when the queue is empty, the auto-write context (if enabled) will be loaded into the active registers and the data will be immediately stored into the buffer. The first TE entry will be created with its "status" control bit set, its "data" control bit reset, and its "stop" control bit set. When the microprocessor programs the DF context, it should program the DF to transfer to the end of the track. If no further sequential write commands are received, the buffer space will become empty and prevent bogus disk writes. As new sequential write commands arrive, the SCSI core will utilize its capability to extend the DMA context. When a new non-sequential read/write thread TE is retrieved, the data thread complete interrupt will occur once the DMA and SCSI has complete the previous thread, or the status stop interrupt will occur once the new thread's first TE is retrieved and the DXFER counter has reached zero. The microprocessor can then abort and change the DF context. Note that skipped writes are not supported when the DF is programmed to automatically extend the transfer since the disk transfer will write the sectors sequentially on the track.

After the DF context is programmed, the microprocessor preferably programs a status context in the secondary context and then sets the GO bits. The microprocessor should also set the disk and secondary context enable bits to allow automatic reconnects. If an active secondary context (a fully cached read transfer) already exists in the inactive registers, then the microprocessor preferably waits for it to complete before creating the status context. The secondary context will keep attempting to send its data between receiving write commands until successful, upon which an interrupt will be generated. Meanwhile, sequential write commands will continue to be received and written to disk. The DDBRC counter will accumulate released sector pulses until the status context is ready.

After the status GO bit is set, the status retrieval channel will load the DXFER with the next status TE transfer length. When DXFER reaches zero, the status retrieval channel will program the status context with the TE tag, toggle it into the active registers and attempt to send good status. If the data controller of the present invention loses arbitration and instead gets selected, the data context will be toggled back into the active registers if it is another sequential write. After the new command completes, the status context will retry sending status. This continues until the queue is empty. The microprocessor can cause CQE 215 to stop execution of new TE entries 345 by resetting the GO bit.

Writes will be received regardless of available buffer space; if the buffer becomes full, the current automated coalesced write will disconnect. The next sequential write after the intermediate disconnect will be processed the same except its TE will have its "data" and "status" control bits both set. TE entries 345 with "data" and "status" set will always be generated for write commands when the queue is not empty. As the disk starts to empty the buffer by writing sectors to the disk, CQE 215 continues to send status for each status TE entry. When the DBSC reaches the DBSC Threshold (buffer almost empty), the data TE entries become a higher priority. The data retrieval channel retrieves the first data TE entry and programs the TE transfer length into HXFR and the TE tag into the data context. The DMA will then perform a re-selection and receive the write data. This continues until either all the data TE entries 345 have been processed or the buffer becomes full again. CQE 215 then reverts to processing status TE entries 345 until the DBSC Threshold is reached again. Optionally, the firmware can set a bit to give the status TE entries 345 a higher priority. In this case, the Data Retrieval Channel will not program a new data context until the Status Retrieval Channel has retrieved the same TE that the Data Retrieval Channel has pending. The status read pointer will process TE entries with both its "data" and "status" bits set after the data is received and written to disk.

Referring to FIG. 6B, a cached write to the buffer memory will be explained. Data retrieval channel 380 receives a first TE entry 345. To choose the corresponding TCB, the firmware looks up the correct TCB by matching the read pointer value to the first TE values in the TCBs. DMA 225 then transfers the data D1 from the host to the buffer memory as dictated by the context set up by the TCB. When the entire transfer length is complete, status is sent by the context as shown by S1. The next TE entry 345 is retrieved and the previous steps are repeated. Also, the Stop bit is set so that the firmware knows that this is the last TE entry 345 for the current thread.

Status retrieval channel 360 also retrieves TE entries 345 after those entries are retrieved by data retrieval channel 380. Channel 360 programs DXFER register 370 which is decremented by each sector transfer from buffer memory to the disk. The value in DXFER can be used if there is an error condition that occurs during the transfer of data from the buffer memory to the disk. Once DXFER=0, a status thread complete interrupt is generated to inform the firmware that a new disk seek can be initiated.

In more detail, when cached writes are enabled, the DMA data context is programmed with the information from the command and a TE entry 345 is generated with the stop and SRel bits set. The SRel bit causes the Status Retrieval Channel to release DXFER and generate the status stop/ thread complete interrupts as normal but not send status. In particular, the status stop interrupt can still be useful to detect when DF 250 has completed its transfer for the current thread. The microprocessor preferably configures the DMA context to automatically send status after the data transfer for cached writes.

A read operation is shown in FIG. 6C. In this case, data retrieval channel 380 provides transfer length to set up the context between the host and buffer memory and the context between the disk and the buffer memory. The correct TCB is determined by the current pointer value. DF 250 starts the transfer of data between the disk and buffer memory as shown by reference numeral 1. DMA 225 starts to transfer data from the buffer memory to the host some time after DF 250 starts its transfer. Still, DMA 225 may not be able to continuously transfer the entire transfer length because the transfer rate between the buffer memory and the host is much greater than the transfer rate between the buffer memory and the disk. Thus, FIG. 6B shows under the DMA XFER heading that DMA 225 starts transferring data D1, then waits a certain amount of time based on the amount of time DF 250 needs to fill buffer memory to point where DMA 225 can start transferring again, then DMA 225 does continue the data transfer. Once the transfer length is completed, data retrieval channel 380 sends status. Those steps are repeated for the second and final TE entry 345.

As for the cached write, status retrieval channel 360 also retrieves TE entries 345 one behind those used by data retrieval channel 380. The functioning of the status retrieval channel 360 is preferably ignored for this type of data transfer. This is an option for any DMA context to perform at the end of the data transfer. The firmware sets this option for the thread and based on the TCB. If the DMA context is the same as the data formatter context, then the data context loads DXFER 370 to track when DF 250 is done. At this point, a data thread complete interrupt is generated so that the firmware can start a new disk seek. The value in DXFER can be used if there is an error condition that occurs during the transfer of data from the buffer memory to the disk.

In more detail, for the first read command of a thread, a selection interrupt, a stop interrupt, and a thread complete interrupt should occur. The firmware preferably creates a new disk context and a new DF context with matching IDs, and then programs the data retrieval channel's context ID to the disk context and set the data channel's GO bit. The used TE entries 345 should be recycled from channel 380. A DF 250 transfer should read forever; if the buffer becomes full, DF 250 will pause and wait for buffer space to become available before continuing. The status channel's GO bit can optionally be set to allow the Status Channel's Read_Ptr to automatically advance to the next thread. The status control bit is normally not needed for reads since good status is always sent after the read data. However, a special case where the microprocessor could use the status channel for a read is when the read begins as a non-disk cache context and only later becomes the disk context. In this case, the data and SRel bits could both be set. The data bit causes normal data transfer to occur and the SRel bit can be used by the status channel to release the DXFER count after the DMA context becomes the disk context.

CQE 215 will generate the first TE entry 345 and then retrieve it when the data GO bit becomes set. Data retrieval channel 380 will then load the HXFR, and the DXFER if the data context is the disk context, with the TE transfer length and then discard the TE entry 345. The DMA context is also loaded with the TE tag. As the disk transfer fills up the buffer, the first command's data transfer will complete and good status will be sent immediately afterward. Transfers and automatic status will continue to be sent until the queue is empty or a TE entry 345 with the Stop bit is retrieved. If a transfer reaches a buffer empty condition, it may be swapped to the inactive registers until data is available again. Read transfers operate with the normal buffer thresholds to control reconnection. Since a read transfer will complete in the active registers, the update from the TE entry 345 will occur in the active registers and a new transfer will be immediately initiated. When the queue becomes empty, the GO bit will remain set so that additional sequential reads can be queued without microprocessor intervention. If the microprocessor changes the disk context, it preferably first clears the GO bit.

In the case where a new read thread arrives which begins on data already prefetched into the buffer, the data channel can be started with the data context equal to a non-disk context (such as the other context) while the disk completes any previous operations, such as a disk write, and then seeks to back-fill the new read thread. The DMA Paused interrupt should be enabled for the data context to allow the microprocessor to receive an interrupt as soon as the amount prefetched has been exhausted. At this point, as soon as the DF context is programmed for this thread, the data context should be switched to the disk context. The DXFER should be loaded with the amount remaining in HXFER. Now the data context will receive the new DBR pulses from the DF and continue the read as a disk read.

One exception to this flow occurs if the command in the DMA context is the last command of the thread. In this case, the data stop interrupt will still act as if the context were not the disk context since the context was originally programmed from TE entry 345 as a non-disk context. Therefore, the data stop interrupt will occur as soon as a new TE entry 345 is loaded with the stop bit set, instead of waiting for DXFER to go to zero. The microprocessor can work around this several ways, including by verify DXFER is zero at the data stop interrupt, or by ignoring the data stop interrupt until this first command completes and generates the DMA done interrupt. The microprocessor could also create a fake TE which re-programmed the data context as a disk context with the remaining DXFER length. This fake TE is preferably prevented from being recycled. Another alternative would be to only allow the non-disk context to transfer to a TE boundary. Then the disk context could always be started from a new command's TE. However, if the non-disk context runs out of buffer space, it could perform a disconnect/reconnect for each sector until this last command's transfer completes. If the status channel is completing a thread while the data channel returns cached read data, recycling of used pointers should be prevented until the point where the status channel is caught up and the data context is converted back to the disk context.

For automated host context switching, Buffer Manager 230 in FIG. 2 supports a multi-context Host DMA engine. This support provides a certain level of automation to the management of contexts, but does not eliminate the microprocessors participation in context management. Virtually any number of contexts are supported; two are stored on chip and the rest are stored as context frames in the buffer memory. The context swapping capability is implemented by providing an active and inactive set of registers. Each set of registers contains data which defines one context. DMA 225 can toggle between the active and inactive context frames, allowing very fast swaps in situations where the next context frame needed has been anticipated and loaded to the inactive registers. The active context registers are read-only, and the inactive context registers can be read/written by the microprocessor or loaded/stored from/to a context frame in buffer memory. There are additional registers associated with the Context Swapping logic which are more closely associated with the Host DMA Block than with the Buffer Manager, including the Host Buffer Space Counter (D_HBSCB/A) and Host Transfer Counter (D_HXFERB/A). CQE 215 programs the DMA context with the QTag and the length for DXFER and HXFER; and sets the transfer enable of the release enable.

A context ID is used as an index into a Context Base Address Table register file to fetch the context address pointer. These pointers are used by the Buffer Manager's Swap Engine when loading or storing context frames. The context is then transferred starting at the loaded context address pointer location. This provides total flexibility of the location of context data.

The Swap Engine performs the transfer of context frames between the inactive registers and the buffer memory. The inactive registers are connected in a parallel shift register structure. During context loads, the Swap Engine shifts data into this shift register which it reads from the buffer. During context stores, it shifts data out of the shift register and writes it to the proper frame in the buffer. The Swap Engine contains a counter which counts 32 bytes for a SCSI context frame. The microprocessor and Host DMA may only initiate one context action at a time, such that there is no request overlap. When a toggle between the active and inactive context is performed, the data is swapped between register sets in one clock cycle.

DF 250 context management is handled by the microprocessor. All controller registers associated with a DF context are accessible to the microprocessor, which preferably performs the transfer of data between these registers and the buffer memory. Since DF context swaps will typically involve a seek, there will be time for the microprocessor to perform the context swap. A more detailed explanation is provided in copending U.S. patent application Ser. No. 08/720,393 entitled "METHOD AND STRUCTURE FOR AUTOMATED SWITCHING BETWEEN MULTIPLE CONTEXTS IN STORAGE SUBSYSTEM TARGET DEVICE," to Richard M. Born et al., filed Sep. 30, 1996 and assigned to the assignee of the present invention, that application is incorporated herein by reference.

For both the disk and host, an active buffer segment is managed by a Buffer Space Counter which tracks the difference in the number of released sectors read from and written to the segment. The Buffer Space Counter is incremented by each disk sector transfer and decremented by each host sector transfer. "Released" refers to successful completion of the sector transfer.

The Host Buffer Space Counter (D_HBSCB/A) is contained in DMA 225, which throttles the SCSI block according to buffer space conditions for the active context. A Disk Block Release (DBR) pulse increments the D_HBSCB/A for each successfully transferred sector to/from disk. For disk writes, this includes buffer CRC check and on-track verification by the microprocessor; for disk reads, this includes ECC check and NRZ parity check.

The Disk Buffer Space Counter (B_DBBSC) is contained in the buffer manager, which the disk formatter according to buffer space conditions. The B_DBSC is incremented at the beginning of each sector that the disk transfers or skips. The B_DBSC is decremented for each Host Block Release (HBR) received from the Host DMA Block. The B_SEGSIZE register contains the size, in sectors, of the active disk segment. This register is written by the microprocessor, and is compared against the B_DBSC to detect buffer full (read) or empty (write) conditions. The B_DBSC and D_HBSCB should be programmed with the same initial value for a given context; that is, the B_DBSC should be programmed to B_SEGSIZE for a write and to 0 for a read, both of which indicates the buffer is empty.

In the event that the active host context coincides with the DF context, the D_HBSCA compares to 0 for empty/fill condition and the B_DBSC compares against B_SEGSIZE for empty/full condition. The difference in the count is a result of the delay of the release mechanism. For example, on a disk read the B_DBSC is incremented as soon as a sector is written into the buffer, but the D_HBSCA is not incremented until the ECC block releases the sector. In all cases where the host and DF contexts aren't coincident, both space counters are necessary in order to extend segment over/under run prevention across context swapping boundaries.

A DBSC Threshold register exists to notify the Host DMA when the buffer space is nearly full/empty on a disk write/read. The threshold may be programmed to a number of sectors less than B_SEGSIZE to notify the Host DMA that the buffer is nearly full or empty so that the Host DMA can swap in the same context as the disk and begin emptying/filling the buffer before it becomes full/empty, thus avoiding an extra disk revolution because the buffer was not ready during a disk transfer.

Since all data integrity checks in the DMA occur real-time as the sector is being transferred, the release of sectors by the DMA occurs immediately after the sector is transferred. On writes, the DMA releases sectors to DF 250 via Host Block Release (HBR) pulses once each sector has been fully written to the buffer and the SCSI parity has been checked for each byte. Once released, the B_DBSC will allow DF 250 to write this sector to the disk. On reads, the DMA releases sectors to DF 250 once each sector has been fully read from the buffer and the CRC has been verified. Note that this is before the sector has finished transfer on the SCSI bus; this is partly what allows the DMA to burst REQs across sector boundaries. Once released, the B_DBSC will allow DF 250 to read a new sector over this sector in the buffer, unless the segment size is programmed to be smaller than the base/ceiling define the segment size. Note that HBR's are not generated if the DMA is currently pausing due to a SCSI bus attention condition.

The data integrity checks required for DF 250 to release sectors begin after the sector is transferred and preferably performed in parallel with new sectors being transferred. On disk reads, the ECC checks are performed real-time as the next sector is being transferred into the buffer. The ECC actually consists of three pipeline stages such that the first stage processes a first sector as it is being transferred into the buffer, the second stage completes as a second sector is being transferred, and the third stage may complete during the second or the third sector being transferred. Preferably, the B_SC and B_SCA registers are allowed to immediately release these sectors with DBR pulses. The DBR pulse can increment the D_HDCOUNT and D_DDCOUNT counters in the DMA and if the active DMA context is the DF context, then the D_HBSC counter is incremented and the D_DXFER counter is decremented. The DBR pulse also increments the B_RDCOUNT Retry DBR Counter, which should be used for a retry in the case the ECC checks fail. If the ECC is disabled, then B_SC is incremented at the end of each sector after the buffer has taken all the data from the disk FIFO.

On disk writes, DF 250 increments the B_SC count as soon as the sector has been transferred to the disk (at which point the ECC has also completed the CRC check). The servo system releases the sectors as servo samples are passing. At each servo, the count in B_SC is added into the B_SCA count. The servo system should then pulse the DATA_REL input pin to release the sectors accumulated in the B_SCA.

DMA 225 preferably handles numerous concurrent transfers with hardware management of a segmented buffer space. Each transfer can complete the data transfer, manage multiple disconnect/reconnect sequences, interlace data from two separate transfers, and send status without requiring any interaction from the microprocessor during the transfer. This is accomplished by programming each concurrent transfer into a separate context. Each context contains all the counters and configuration information for a particular transfer. There is enough storage on chip for two contexts: an active context and an inactive context. The active context is the context which is currently transferring data while the inactive context allows quick context swaps to the active context. Only the hardware can update the active context, but either microprocessor or hardware can update the inactive context. Each context register is referenced with a suffix of B or A to illustrate that it is a context register and could be in either the inactive (B) or active (A) contexts. Every context has storage assigned to it in the buffer where the context information can be stored when the context is not in the active or inactive registers (off chip). When a context is on chip, the stored version of the context in the buffer space is considered stale, and only the on chip version contains the most recent changes to the context.

Each context is capable of transferring large amounts of data from/to a segment of the buffer. Since the amount of data to be transferred may be larger than the segment size, dynamic management of the buffer space is preferred. This is accomplished by partitioning a transfer and the buffer segment into blocks called sectors. A sector is the unit of buffer space management and is used to determine boundaries for buffer protection and clean places for context pauses. A sector can range from 2 to 4094 bytes. Each sector is protected while in the buffer with 32 bits of CRC and encoded with a logical sector address. The buffer space is managed by using a host buffer space counter (D_HBSCB/A), and the transfer size is defined by the host transfer counter (D_HXFERB/A) and the sector size counter (D_SSCB/A).

The D_HBSCB/A is loaded with the number of sectors available in the buffer for Disk Read operations (typically 0 for a new read command) or the amount of space available in the buffer for Disk Write operations (the segment size). The D_HBSCB/A is decremented each time the sector size counter is loaded by the sector size and is incremented each time a sector is transferred correctly over the Disk interface (indicated by DBR—Disk Block Release). When the D_HBSCB/A equals zero, the buffer segment is either full (for writes) or empty (for reads) and prevents the DMA transfer from continuing until the D_HBSCB/A is incremented. When the active DF context is not the same as the active host context, DBR pulses are accumulated in the host disk block release counter (HDCOUNT) until the host context is the same as the DF context again and DBR pulses can be accumulated in the D_HBSCA.

The D_HXFERB/A counter is initialized with the number of sectors to be transferred across the DMA interface for a given Disk Read or Disk Write Command. If it is not zero, the D_HXFERB/A counter is decremented each time the sector size counter is loaded with the sector size. The D_HXFERB/A can also be used to release sectors of buffer space while transferring no data by setting the release mode bit. The releasing of sectors will continue while both the D_HBSCB/A and the D_HXFERB/A counters are greater than zero.

To manually release allocated sectors from the buffer, D_HXFERB/A can be programmed with the number of sectors that you want to release. The microprocessor should then toggle this context into the active registers. Once this context becomes active, D_HXFERA will decrement down to zero, the sectors in the buffer will be released, and the address pointer and logical sector counter will increment as if the sectors were actually transferred.

The microprocessor can also write TE entries 345 into TE list 350 of the buffer and/or reorder the existing TE entries 345. If the end of the existing TE list 350 has a new TE entry 345 (i.e., added by the microprocessor), the microprocessor should first pause TE generator 300 to prevent a collision with new TE entries 345 being written to TE list 350. The retrieval GO bits should always be cleared to prevent a collision with automatic reads of TE entries 345. If the microprocessor wishes to insert a new TE entry 345 into TE list 350, it can obtain a free pointer from either the head or tail registers 322, 324 for free pointers list 330. The microprocessor adjusts the head or tail pointer to reflect that the pointer is now not free. After any new TE entries 345 are written to the buffer memory with the next pointer correct, the microprocessor preferably completes the re-ordering by updating the previous next pointer. If the last TE entry 345 in the queue (TE list 350) changed, then the microprocessor preferably updates the TE generator 300's next, current and previous pointers to allow the next generated TE entry 345 to be written to the correct address of TE list 350 with the correct Next TE pointer. If TE entry 345 currently being pointed to by the status or data retrieval channels 360, 380 is changed, then the appropriate retrieval channel's read pointer and possibly the respective staging registers will need to be modified. A Valid bit exists to indicate if the staging registers already hold a valid TE entry 345. Then, the pause TE generation bit can be cleared and the GO bits set again.

Six interrupts exist to handle CQE 215 operations. The microprocessor should carefully mask/unmask the appropriate interrupts depending on the next type of thread (read/write) to begin retrieving and the number of threads and/or TE lists that exist. The two primary CQE interrupts are the Status Thread Complete and Data Thread Complete interrupts. The Status Thread Complete interrupt occurs if the previous thread had the status control bits set and a new TE clears the status GO bit and after all previous TE entries 345 associated commands have completed on the SCSI bus. In addition, this interrupt is gated until any DMA context in progress has completed. The data thread complete interrupt occurs if a new TE entry 345 clears the data GO bit and after all previous TE entries 345 associated commands have completed on the SCSI bus.

Two other CQE interrupts are the Data Stop and Status Stop interrupts. The Data Stop interrupt is generated when a stop TE clears the data GO bit. Also, if the data context (the context for data transfer between the buffer memory and the host) is the same as the disk context (the context for data transfer between the buffer memory and the disk) and is a read, the Data Stop interrupt doesn't occur until DXFER register 370 reaches zero. The Status Stop interrupt is generated when the previous thread had a status bit set and a stop TE clears the status GO bit. These interrupts can be used to indicate good points to re-order any interleaved threads or change the DF context (since DXFER register 370 has always reached zero at this point).

The final two CQE interrupts are the Queue Empty and Data Queue Not Empty interrupts. The Queue Empty interrupt occurs when the data and status TE entry 345 queues are both empty. Normally this interrupt should be masked so brief periods between sequential commands will not generate unnecessary interrupts. However, the microprocessor can use this interrupt for example when wishing to switch to a new TE list after the current list is finished. On reads, the empty interrupt will occur as the data TE is discarded (as long as the status TE has already discarded its TE), which is at the same point where the data context is loaded and started. On writes, the empty interrupt will occur after the status TE is discarded, which is after DXFER becomes zero. The Data Queue Not Empty interrupt occurs when the data retrieval channel detects the data queue transitioning from empty to non-empty or when the data queue is empty and an auto-data occurs. When the microprocessor changes or stops the DF context, it can enable this interrupt to indicate when the next TE has arrived so the microprocessor can restart the DF context. CQE 215 interrupts are not stacked and have mask bits which prevent an interrupt but do not prevent the interrupt status bit from being set.

The selection interrupt can be configured to not occur for sequential commands which are received and allow the SCSI bus to be released. Commands which pause on the bus due to an exception or when handling linked commands will still receive the selection interrupt when the SCSI core pauses (and the register file will contain the CDB).

At power-up the microprocessor should write TE generator 300's Curr_Ptr value to point to the first TE entry 345 location to write. TE generator 300's Prev_Ptr value can be set equal to the Curr_Ptr 215 value (an illegal setting to indicate the Prev_Ptr value is invalid). Both retrieval channel Read_Ptr values should be set equal to this same Curr_Ptr value. Also, the data retrieval channel 380's Next_Ptr register should be set equal to this same Curr_Ptr value. Now, the TE queue (TE list 350) will be empty, indicated by a "queue empty" status bit. The microprocessor should write all available free pointers except for the pointer in Curr_Ptr into free pointers list 330. CQE 215 Initiator ID can be initialized to this device's ID in order to force the first read/write command to be handled as a non-sequential command.

When the first read/write command is received, TE generator 300 will use its LBA and transfer length to calculate a final LBA. The first TE will be created, the register file will not be released, and a selection interrupt will be generated. A Data Queue Not Empty interrupt will also occur as the TE is written if the data GO bit is cleared. Upon receipt of each subsequent command, the CDB LBA will be compared to the final LBA. If it is sequential, a new TE entry is created and the register file released without a selection interrupt. This may occur many times before the firmware even begins to service the first command interrupt. If a non-sequential read/write command arrives, a TE with the stop bit will be created and a selection interrupt will be generated. Now new sequential commands to this second thread can be queued even before either of the first two selection interrupts are handled. The firmware preferably processes the first command and initiate the appropriate disk transfer. The firmware also preferably programs the data retrieval channel and the DF context with the ID of the DMA context.

As stop and/or thread complete interrupts occur, the firmware can optionally change the DF and DMA contexts for the new threads or try to re-order the queued threads for optimizing the disk performance. Non-read/write commands will receive a selection interrupt and a stop TE will be generated to allow the command to be handled in-order with respect to commands queued before and after the random command. Note that read, write, and non-read/write threads can be interleaved in the queue and the microprocessor preferably correlates the next TE after each stop interrupt with the related CDB received (the tag and Curr_Ptr field as captured with the CDB can help with this) to determine which type of thread is next.

A situation may arise when a write thread is followed by a different write thread in the queue. The first thread's status and data contexts are started as normal. The data contexts will complete once the data is fully cached in the buffer. The status contexts will complete after the data has been fully written to the disk. The Data Thread Complete interrupt will occur as soon as DMA 225 and SCSI core 205 have completed the first write thread and the new thread's data TE entry 345 (with stop set) is retrieved from the queue (TE list 350). At this point, a cache DMA context (not the disk or secondary context) can be setup for the new thread's data context and the data GO bit set. The DMA will write the new thread's data into the buffer memory as it also continues to send status for the old thread. The status stop interrupt will occur once DF 250 has transferred all the write data for the thread and programmed the status context. At this point, the microprocessor can switch the DF context to begin the next write and associate the DF context with the new thread's data context (which automatically causes HBSC to be copied to DBSC). Once all of the old thread's status has been sent, the Status Thread Complete interrupt will occur. The microprocessor can immediately set the status GO bit again to allow status to be sent automatically for the new thread. The microprocessor will not receive another non-error interrupt until a new thread arrives.

Another situation occurs in the case of a write thread, read thread, write thread. This case begins with the write thread as described in the first scenario. When the first thread's Status Stop interrupt occurs, the microprocessor can determine that the next thread is the read thread (tag matches CDB received and read pointer index matches Curr_Ptr field captured with the command). If the data requested is already cached, the read thread can be programmed in the same way as the second write cache thread in the first scenario. The microprocessor may also wish to determine if the third (write) thread is sequential to the first (write) thread and re-order the second read to occur after the third write.

Otherwise, the microprocessor waits for the first thread's Status Stop interrupt and then switches the DF context to perform the new read thread. The microprocessor now sets both the data and status GO bits. Status retrieval channel 360 simply retrieves and discards all the read thread TE entries 345 until the next thread's stop TE entry 345 is fetched. A Status Thread Complete or Status Stop interrupt is not generated for this thread since no status TE entries 345 were retrieved. The Data Stop interrupt will occur as soon as all the read data has been loaded from DF 250 into the buffer memory. The microprocessor can now switch the DF context to handle this last write thread. The Data Thread Complete interrupt occurs once the DMA/SCSI have completed the data and status transfer. At this point, the microprocessor can reprogram the data and status DMA contexts for the last write thread and set the status and data retrieval channel GO bits again. Note that a non-disk DMA context could have begun to receive the third (write) thread's data as the disk read was occurring.

In a multi-threaded and/or multi-initiator environment, the microprocessor may wish to re-order the threads as they arrive to completely handle one thread before beginning the other interleaved threads. The above write-read-write thread scenario could be re-ordered to perform the first and third write threads first if they are sequential and then begin the second read thread. The threads could be re-ordered as soon as the third write thread's selection interrupt is received. The microprocessor may optionally wish to slightly delay starting new threads in a multi-threaded environment to give the current DMA thread's initiator some opportunity to provide new commands which continue the current DMA thread (the delay to setup a new thread's DMA context may be enough delay to allow a new selection to begin, or the microprocessor could wait until the disk completes the thread). The microprocessor can quickly determine if a new command is a continuation of a previous thread by comparing the command's LBA with the previous final LBA's as captured in the register file status for each previous new thread. Once the microprocessor determines that a sequential command to the current DMA thread has arrived, it can clear the GO bits and use the Curr_Ptr and Prev_Ptr fields for the previous threads (as captured in the register file status for each previous new thread) to determine where each non-sequential thread exists in the buffer. The non-sequential threads can be moved to a new queue in the buffer and the active queue re-linked to eliminate these entries. Now the microprocessor can remove all the stop bits and re-enable the GO bits to allow the read channels to continue with the sequential thread. When the microprocessor wishes to switch the retrieval channels to a new thread's queue, it can disable the GO bits and pause TE generator 300 to provide a clean moment, merge the old queue into the new queue as necessary, modify TE generator 300 and retrieval channel fields, then re-enable the GO bits and TE generation to continue CQE 215 automation.

If a CQE command needs to be aborted, the microprocessor should first locate the command. This preferably requires searching the TE list(s) 350 in the buffer memory, starting with the current DMA contexts, then TE entries 345 in the on-chip registers, then following the Next_Ptr fields through the buffer memory TE list 350. If the command is already in the DMA context, then the context can be aborted or modified to complete with the appropriate status. For disk read contexts, also clear DXFER. If the TE entry 345 is in the status or data channel's on-chip registers, then that TE entry 345 can be discarded by simply clearing all the control bits. For status TE entries 3445, DXFER register 370 is also cleared. Similarly, a TE entry 345 in the buffer memory can be discarded (once it is retrieved) by clearing all the control bits. If an entire thread is being aborted, or if the last TE entry 345 in a thread is being aborted, then the following procedure is preferably performed:

abort the data context;
  on writes, abort the status context;
  clear DXFER;
  set the stop bit in the on-chip TE entry 345;
  set the GO bit;
  generate stop and thread complete interrupts for the data and status channels; and
  clear the control bits in the on-chip TE entry 345 so it can be discarded.

CQE 215 can handle simple, ordered, and head-of-queue Queue Codes since they are handled in-order. The microprocessor can manage commands queued in his command queue such that they are handled in-order with respect to commands in the TE queue. To do this, the microprocessor should clear his queue before starting CQE 215, and then clear it again on any stop interrupt before setting the GO bits again. This allows CQE 215 to execute sequential TE threads without regard to the Queue Code. However, the Queue Code is added to the TE control byte to allow the microprocessor to re-order threads during a stop condition. Optionally, CQE 215 can be configured to not handle every Queue Code or to only handle Queue Codes of the same type as sequential. This allows the microprocessor to retain commands in its queue and continue the sequential thread as long as only simple or head-of-queue commands are received (for example).

The present invention is exemplified by the written description and accompanying drawings. The present invention, however, should not be limited to such description and drawings. Instead, the scope of the appended claims is intended to encompass modifications to the present invention. For example, register files 720 are disclosed as including two register files. The present invention can operate one or more register files. Choosing the number of register files is partly based on the speed that for the specific use of the present invention. Also, the present invention is disclosed with regards to a SCSI environment. Yet the present invention can be advantageously utilized with Fiber Channel or IDE.

Each TE entry 345 is described as having the information provided in Table 1. Depending on the application, a TE entry can have any combination of that information. For example, the TE entry can contain all the information in the received command. In that case, CQE 215 can directly set up the necessary contexts for data transfer without firmware intervention. On the other end, at TE entry can simply have the length of the desired transfer for the associated command. It is then apparent to one skilled in the art that the information provided in the TE entry is partly based on efficiency, cost, physical area and the command protocol itself.

The present invention is illustrated as having two retrieval channels. However, certain parameters may allow the use of only one retrieval channel. That channel would function to program the length of the data transfer for the associated TE entry and command. As for the TE entry 345, the functions of the data channel can be enhanced by utilizing certain information contained in the TE entry. That information and how it is used is based on the requirements of a system.

The firmware of the present invention provides many functions. First, the firmware is notified by either the status or data thread release interrupt that a new disk seek may be initiated. This is important since the transfer speed between the disk and the data controller is usually the limiting factor in data transfer capability. Second, the firmware can, via TCBs, link TE entries of one thread that are sequential to TE entries of another thread. This provides for enhanced data rate transmission. Third, the firmware, via TCBs, aids in determining information important to an error condition. By saving the first and last TEs and the first and last LBAs, the firmware can quickly determine which command thread the error condition occurred. The firmware can then reprogram the thread transfer where it stopped or can abort the remaining transfer of the thread. The firmware can even start the thread from the beginning LBA.

The TE generator and retrieval channels concurrently monitor command processing of the data formatter, DMA and SCSI core. Such concurrent monitoring provides for efficient and rapid data transfer.

We claim:

1. A method of data transfer between a peripheral device and a host computer, the method comprising the steps of:
   (A) generating a plurality of transfer extend entries in the peripheral device in response to a plurality of commands received from the host computer;
   (B) arranging the plurality of transfer extend entries into at least one thread in response to step (A);
   (C) interrupting a processor of the peripheral device in response to starting a new thread of the at least one thread; and
   (D) interrupting the processor in response to completing the new thread.

2. The method of claim 1 wherein the transfer extend entry includes a length of a desired transfer.

3. The method of claim 2 wherein the transfer extend entry includes a next pointer.

4. The method of claim 3 wherein the transfer extend entry includes at least one of the control bits Stop, Stat, DRel, SRel and Data.

5. The method of claim 4 wherein the transfer extend includes a QTag and a QCode.

6. The method of claim 1 wherein the generating step generates a transfer extend entry for a respective command.

7. The method of claim 1 wherein the transfer extend entry includes a type of selection.

8. The method of claim 1 wherein free pointers are used to generate the transfer extend entry.

9. The method of claim 1 further comprising the step of storing the at least one transfer extend.

10. A data controller of a peripheral device in communication with a host computer, the data controller comprising:
    a processor; and
    a transfer extend generator configured to (i) generate a plurality of transfer extend entries in response to a plurality of commands received from the host computer, (ii) arrange the plurality of transfer extend entries into at least one thread, (iii) interrupt the processor in response to starting a new thread of the at least one thread, and (iv) interrupt the processor in response to completing the new thread.

11. The data controller of claim 10 wherein the transfer extend generator utilizes free pointers to generate the transfer extend entries.

12. The data controller of claim 10 wherein a transfer extend entry is generated for each read and write command.

13. The data controller of claim 10 wherein the transfer extend generator determines if a command is sequential to a previous command.

14. The data controller of claim 13 wherein the transfer extend generator stores a range value that is used to determine if the command is sequential to a previous command.

15. The data controller of claim 13 wherein the transfer extend generator generates a new transfer extend entry and updates an address value if the command is sequential to a previous command.

16. The data controller of claim 13 wherein the transfer extend generator generates a new transfer extend entry with a Stop bit set and updates an address value if the command is not sequential to a previous command.

17. A peripheral device to a host computer, the peripheral device comprising:
    means for generating a plurality of transfer extend entries in response to a plurality of commands received from the host computer;
    means for arranging the plurality of transfer extend entries into at least one thread in response to generating;
    means for interrupting a processor of the peripheral device in response to starting a new thread of the at least one thread; and
    means interrupting the processor in response to completing the new thread.

\* \* \* \* \*